(12) United States Patent
Tsutsumi et al.

(10) Patent No.: US 9,281,539 B2
(45) Date of Patent: Mar. 8, 2016

(54) ELECTRICAL STORAGE DEVICE INCLUDING FIBER ELECTRODE, AND METHOD OF FABRICATING THE SAME

(75) Inventors: Kazuo Tsutsumi, Kobe (JP); Kazuya Nishimura, Kakogawa (JP); Tomoaki Takasaki, Kobe (JP); Masateru Nakoji, Okazaki (JP); Tetsuo Sakai, Ikeda (JP); Jinhan Yao, Ikeda (JP); Makoto Saito, Ikeda (JP); Takashi Mukai, Ikeda (JP)

(73) Assignee: KAWASAKAI JUKOGYO KABUSHIKI KAISHA, Kobe (JP)

( * ) Notice: Subject to any disclaimer, the term of this patent is extended or adjusted under 35 U.S.C. 154(b) by 969 days.

(21) Appl. No.: 13/384,060

(22) PCT Filed: Jul. 13, 2010

(86) PCT No.: PCT/JP2010/004526
§ 371 (c)(1),
(2), (4) Date: May 7, 2012

(87) PCT Pub. No.: WO2011/007548
PCT Pub. Date: Jan. 20, 2011

(65) Prior Publication Data
US 2012/0219844 A1    Aug. 30, 2012

(30) Foreign Application Priority Data
Jul. 14, 2009   (JP) ................. 2009-165568

(51) Int. Cl.
*H01M 4/75*   (2006.01)
*H01G 9/025*  (2006.01)
(Continued)

(52) U.S. Cl.
CPC ........... *H01M 10/0525* (2013.01); *H01G 11/06* (2013.01); *H01G 11/40* (2013.01);
(Continued)

(58) Field of Classification Search
CPC ..... H01M 4/70; H01M 4/75; H01M 10/0413; H01M 10/0525; H01M 10/0562; H01M 2/1061; H01M 4/0404; H01M 4/0409; H01M 4/131; H01M 4/136; H01M 4/1391; H01M 4/1397; H01M 4/485; H01M 4/505; H01M 4/525; H01M 4/5805; H01M 4/5815; H01M 4/5825; H01M 4/66; H01M 6/46; H01G 11/06; H01G 11/40; H01G 11/46; H01G 11/50; Y02E 60/122; Y02E 60/13; Y10T 29/49108

See application file for complete search history.

(56) References Cited

U.S. PATENT DOCUMENTS 3,162,549 A   12/1964  Jeannin
3,859,140 A *  1/1975  Schmidt ..................... 429/99
(Continued)

FOREIGN PATENT DOCUMENTS

EP   0 149 763 A2   7/1985
EP   0 716 466 A1   6/1996
(Continued)

OTHER PUBLICATIONS

U.S. Office Action for U.S. Appl. No. 13/147,769, dated Sep. 25, 2014.
(Continued)

*Primary Examiner* — Carlos Barcena
(74) *Attorney, Agent, or Firm* — Marshall, Gerstein & Borun LLP

(57) ABSTRACT

An object of the present invention is to provide a highly efficient electrical storage device that uses a fiber positive electrode and a fiber negative electrode and in which lithium ion is used as an intercalating species, and to provide a method of fabricating the electrical storage device. The electrical storage device according to the present invention includes: a fiber positive electrode including an electrically conductive fiber, the fiber having a surface on which a positive electrode active material coating is formed, the positive electrode active material coating containing a transition metal oxide represented by a chemical formula 1 which is $(Li_{1-x}A_x)_a M_b X_c O_d$; a fiber negative electrode including an electrically conductive fiber, the fiber having a surface on which a negative electrode active material coating is formed; a separator; and an electrolyte (in the chemical formula 1, A is at least one kind of alkali metal selected from the group consisting of Na, K, Rb, and Cs; M is at least one kind of transition metal selected from the group consisting of Ti, V, Cr, Mn, Fe, Co, Ni, Cu, Nb, Mo, Ru, Pd, Ag, Ta, W, Ce, Pr, Sm, Eu, and Pb; X is at least one kind of typical elements selected from the group consisting of B, Al, Si, P, S, Ga, and Ge; and $0<a\leq6$, $1\leq b\leq5$, $0\leq c\leq4$, $0<d\leq12$, $0\leq a/b\leq4$, and $0\leq x\leq0.5$).

10 Claims, 10 Drawing Sheets

(51) Int. Cl.

| | |
|---|---|
| *H01M 4/505* | (2010.01) |
| *H01M 4/82* | (2006.01) |
| *H01M 4/485* | (2010.01) |
| *H01M 4/525* | (2010.01) |
| *H01M 10/0525* | (2010.01) |
| *H01G 11/06* | (2013.01) |
| *H01G 11/40* | (2013.01) |
| *H01G 11/46* | (2013.01) |
| *H01G 11/50* | (2013.01) |
| *H01M 2/10* | (2006.01) |
| *H01M 4/04* | (2006.01) |
| *H01M 4/131* | (2010.01) |
| *H01M 4/136* | (2010.01) |
| *H01M 4/1391* | (2010.01) |
| *H01M 4/1397* | (2010.01) |
| *H01M 4/58* | (2010.01) |
| *H01M 4/66* | (2006.01) |
| *H01M 6/46* | (2006.01) |
| *H01M 10/04* | (2006.01) |
| *H01M 10/0562* | (2010.01) |
| *H01M 4/70* | (2006.01) |

(52) U.S. Cl.
CPC .............. *H01G 11/46* (2013.01); *H01G 11/50* (2013.01); *H01M 2/1061* (2013.01); *H01M 4/0404* (2013.01); *H01M 4/0409* (2013.01); *H01M 4/131* (2013.01); *H01M 4/136* (2013.01); *H01M 4/1391* (2013.01); *H01M 4/1397* (2013.01); *H01M 4/485* (2013.01); *H01M 4/505* (2013.01); *H01M 4/525* (2013.01); *H01M 4/5805* (2013.01); *H01M 4/5815* (2013.01); *H01M 4/5825* (2013.01); *H01M 4/66* (2013.01); *H01M 6/46* (2013.01); *H01M 10/0413* (2013.01); *H01M 10/0562* (2013.01); *H01M 4/70* (2013.01); *H01M 4/75* (2013.01); *Y02E 60/122* (2013.01); *Y02E 60/13* (2013.01); *Y10T 29/49108* (2015.01)

(56) References Cited

U.S. PATENT DOCUMENTS

| | | | |
|---|---|---|---|
| 4,522,897 A | 6/1985 | Walsh | |
| 5,449,574 A | 9/1995 | Higley | |
| 5,518,836 A | 5/1996 | McCullough | |
| 6,986,877 B2 | 1/2006 | Takikawa et al. | |
| 2003/0180610 A1* | 9/2003 | Felde et al. | 429/217 |
| 2004/0036444 A1* | 2/2004 | Oogami | 320/110 |
| 2005/0025970 A1 | 2/2005 | Stipanovic | |
| 2007/0243456 A1 | 10/2007 | Ahn et al. | |
| 2007/0248520 A1* | 10/2007 | Faulkner | 423/306 |
| 2008/0318133 A1* | 12/2008 | Matsuyama | H01M 4/13 429/300 |

FOREIGN PATENT DOCUMENTS

| | | |
|---|---|---|
| JP | 53-104826 | 9/1978 |
| JP | 59-215497 A | 12/1984 |
| JP | 64-045858 | 3/1989 |
| JP | 03-206173 A | 9/1991 |
| JP | 05-275077 A | 10/1993 |
| JP | 05-275084 A | 10/1993 |
| JP | 07-268771 | 10/1995 |
| JP | 08-227726 A | 9/1996 |
| JP | 08-264203 A | 10/1996 |
| JP | 09-248810 | 9/1997 |
| JP | 10-284053 A | 10/1998 |
| JP | 11-021128 A | 1/1999 |
| JP | 11-104545 | 4/1999 |
| JP | 11-180717 A | 7/1999 |
| JP | 11-233151 A | 8/1999 |
| JP | 11-244009 | 9/1999 |
| JP | 2000-228213 A | 8/2000 |
| JP | 2000-340227 A | 12/2000 |
| JP | 2001-068094 A | 3/2001 |
| JP | 2001-110445 A | 4/2001 |
| JP | 2001-256968 A | 9/2001 |
| JP | 2001-313069 | 11/2001 |
| JP | 2002-053266 A | 2/2002 |
| JP | 2002-180372 A | 6/2002 |
| JP | 2003-157833 A | 5/2003 |
| JP | 2003-203626 A | 7/2003 |
| JP | 2003-317794 A | 11/2003 |
| JP | 2004-193062 A | 7/2004 |
| JP | 2007-042603 A | 2/2007 |
| JP | 2007-533098 A | 11/2007 |
| WO | WO-01/84654 A1 | 11/2001 |
| WO | WO-2005/098994 A1 | 10/2005 |
| WO | WO-2006/077192 A1 | 7/2006 |
| WO | WO-2010/058574 A1 | 5/2010 |

OTHER PUBLICATIONS

Derrien et al., "Nanostructured Sn—C Composite as an Advanced Anode Material in High-Performance Lithium-Ion Batteries", Advanced Materials, 2007, 19, 2336-2340.

International Search Report for PCT/JP2010/004526, mailed Oct. 5, 2010.

Gummow, R.J., et al., An Investigation of Spinel-Related and Orthorhombic $LiMnO_2$ Cathodes for Rechargeable Lithium Batteries,: J. Electrochem. Soc., vol. 141, No. 5, May 1994.

Tabuchi et al., "Electrochemical and magnetic properties of lithium manganese oxide spinels prepared by oxidation at low termperature of hydrothermally obtained $LiMnO_2$," Solid State Ionics, pp. 53-63, 1996.

Extended European Search Report for Application No. 10799612.6, dated Oct. 28, 2013.

Extended European Search Report for European Patent Application No. 1073833.3, dated Oct. 17, 2003.

Extended European Search Report for European Patent Application No. 10799613.4, dated Oct. 29, 2013.

International Search Report for PCT/JP2010/000600, mailed May 25, 2010.

International Search Report for PCT/JP2010/004528, mailed Oct. 5, 2010.

Tamura et al., "Study on the anode behavior of Sn and Sn—Cu alloy thin-film electrodes," Journal of Power Sources 107, pp. 48-55, 2002.

Yao et al., Abstract No. 532, 216th ECS Meeting, The Electrochemical Society, 2009.

* cited by examiner

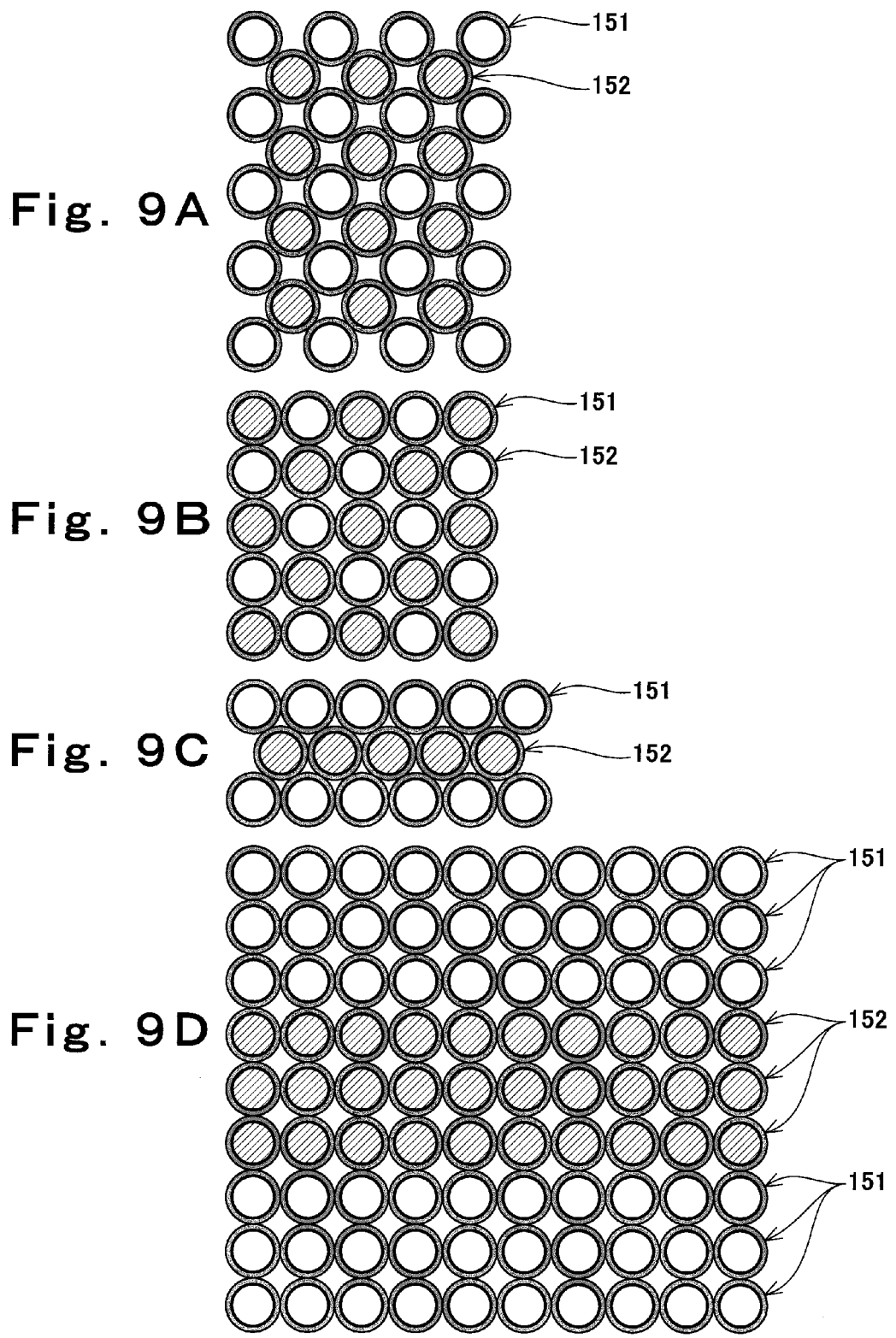

ELECTRICAL STORAGE DEVICE INCLUDING FIBER ELECTRODE, AND METHOD OF FABRICATING THE SAME

TECHNICAL FIELD

The present invention relates to an electrical storage device including fiber electrodes (fiber positive electrode and fiber negative electrode), such as a battery or a capacitor, and to a method of fabricating the electrical storage device. Preferably, the present invention is applied to a lithium ion battery.

BACKGROUND ART

Conventional lithium ion secondary batteries include a plate-shaped positive electrode, a separator, and a plate-shaped negative electrode. Such a battery is formed by using, as an electrolyte solution, an organic solvent such as ethylene carbonate (EC) or dimethyl carbonate (DMC) in which a lithium salt such as $LiPF_6$ is dissolved. In general, an aluminum foil to which a lithium metal oxide is applied is used as a positive electrode current collector, and a copper foil to which a carbon material is applied is used as a negative electrode current collector. Generally speaking, an organic solvent in which a lithium salt is dissolved is used as an electrolyte. A microporous polypropylene or polyethylene film having a thickness of 30 to 80 μm is used as a separator.

Conventional secondary batteries in which an aqueous solution is used as an electrolyte solution include a plate-shaped positive electrode, a separator, and a plate-shaped negative electrode. Generally speaking, in the case of an alkaline secondary battery, an aqueous solution such as a potassium hydroxide aqueous solution, or a potassium hydroxide aqueous solution in which lithium hydroxide is dissolved, is used as an electrolyte solution, and in the case of a lead battery, dilute sulfuric acid is used as an electrolyte solution.

In ordinary alkaline secondary batteries such as nickel metal-hydride batteries and nickel-cadmium batteries, an electrode having a thickness of approximately 0.65 to 0.8 mm is used as a high-capacity electrode, and an electrode having a thickness of approximately 0.3 to 0.5 mm is used as a high-power electrode.

Well-known methods used for fabricating positive electrodes of these alkaline secondary batteries include: a method in which a positive electrode active material is impregnated into a base material (i.e., sintering process); and a method in which a paste containing an active material is filled into a foamed nickel base material (i.e., paste process). In a method commonly used for fabricating negative electrodes of these alkaline secondary batteries, a paste process is performed where a current collector having a two-dimensional structure, such as a perforated metal, is coated with a paste containing an active material and then pressurized. A sintered body that is obtained by sintering carbonyl nickel to a perforated metal, or a porous nickel foam obtained by removing a resin from nickel-plated resin foam through incineration, is widely used as a positive electrode current collector. Although there are publicly known porous bodies having irregularity that are formed through mechanical processing, such porous bodies have not been developed to a practical level. A method commonly used for fabricating electrodes of lead batteries is a paste process. Electrodes used in lead batteries have a greater thickness than that of electrodes used in alkaline secondary batteries.

In alkaline secondary batteries, a polyamide nonwoven fabric or a hydrophilically-processed polyolefin-based nonwoven fabric, having a thickness of approximately 80 to 200 μm, is commonly used as a separator. In lead batteries, a porous body such as paper, porous polyolefin plate, or fiber-glass cloth is used as a separator. Generally speaking, lead batteries are required to contain a large amount of sulfuric acid which is directly involved in charge/discharge reactions. Therefore, a porous body used in lead batteries has a greater thickness than that of a porous body used in alkaline secondary batteries.

Conventional electric double layer capacitors include plate-shaped positive and negative electrodes which are both formed of activated carbon having a large surface area. An electrolyte solution used in such electric double layer capacitors may be either an aqueous electrolyte solution or a non-aqueous electrolyte solution. A sulfuric acid aqueous solution containing approximately 30 wt % of sulfuric acid, or an aqueous solution of potassium hydroxide, is used as an aqueous electrolyte solution. The use of an aqueous electrolyte solution is advantageous from the viewpoint of high-rate charging/discharging (rapid charging/discharging) since an aqueous electrolyte solution has greater ion conductivity than that of a nonaqueous electrolyte solution. However, in the case of an aqueous electrolyte solution, the operating voltage is 1.2 V, which is low, because the operating voltage is limited due to the decomposition potential of water. On the other hand, an electrolyte solution that is obtained by dissolving a salt containing tetrafluoroboric acid or an ethyl group (e.g., tetraethylammonium or tetraethylphosphonium) into an organic solvent such as propylene carbonate is used as a nonaqueous electrolyte solution. Such a nonaqueous electrolyte solution has a stable potential range wider than that of aqueous electrolyte solutions, and therefore, is applicable to capacitors that operate at high voltages of 2 to 4 V.

In ordinary batteries, a solid active material is used as a positive electrode and as a negative electrode. However, in some batteries, gaseous oxygen is used as a positive electrode active material. Such a battery is called an air battery. Coin-shaped zinc-air batteries, in which zinc is used for a negative electrode, are already in practical use. However, these zinc-air batteries are primary batteries. Developments in air secondary batteries with great energy density such as lithium-based batteries have been actively conducted. Such an air secondary battery includes a cathode that serves smooth gas supply and that serves to prevent leakage and volatilization of an electrolyte solution. The cathode used here is formed of a carbon material in which polytetrafluoroethylene (PTFE) is mixed. Discharging progresses when oxygen that has passed through the cathode reacts with the electrolyte. Here, the reaction progresses smoothly if three-phase boundaries, at which the solid phase (cathode material), the liquid phase (electrolyte solution), and the gas phase (oxygen) are in contact with each other, suitably exist.

Known primary batteries, which are not rechargeable after discharging, are dry batteries widely used in small-sized handheld devices such as watches and flashlights. Among the dry batteries, conventional dry batteries are: manganese dry batteries in which manganese dioxide and zinc are used for a positive electrode and a negative electrode, respectively, and a zinc chloride aqueous solution is used as an electrolyte solution; and alkaline manganese batteries in which a potassium hydroxide aqueous solution to which zinc chloride is added is used as an electrolyte solution. Alkaline manganese batteries have greater energy density than that of manganese dry batteries. However, alkaline manganese batteries have high self-discharge. These primary batteries are considered to be unsuitable for applications because internal resistance is high and power consumption is great. Other known primary batteries include silver oxide batteries, mercury batteries, zinc-air batteries, and lithium batteries.

The inventors of the present invention have proposed a battery structure, the conception of which is completely different from that of the above-described conventional electrode assembly which includes a positive electrode, a separator, and a negative electrode. In the proposed battery, a fibrous body having electron conductivity is used as a current collector (see Patent Literature 1). Patent Literature 1 discloses a battery which is particularly intended to realize high power.

Patent Literature 2 discloses a cord-like structure in which: one of an elongated negative electrode member and an elongated positive electrode member, each of which has an electrode active material formed on its outer periphery, is used as a core; the other electrode member is provided around the outer periphery of the core in a concentric manner, with a polymer solid electrolyte disposed between the core and the other electrode member; and these electrode members are sealed by external cladding. Patent Literature 2 discloses a structure which is fundamentally the same as the structure of a conventional Leclanché cell. Specifically, in a dry battery, a positive electrode member is disposed at the center, a negative electrode member is disposed at a peripheral part, and an electrolyte is disposed between these electrode members; and the overall shape is cylindrical. Patent Literature 2 proposes a cord-like structure in which a solid electrolyte is used and which is flexible in its entirety.

Patent Literature 2 does not disclose a specific electrode thickness. However, since the cord-like battery is formed with a single positive electrode and a single negative electrode, such a battery structure disclosed by Patent Literature 2 cannot realize high power.

Patent Literature 3 discloses a battery which is formed by using a fibrous body having electron conductivity. Patent Literature 3 proposes a processing method of an electric device, in which: a group of first fiber electrodes are arranged into a first layer such that the first fiber electrodes are parallel to each other in the first layer; a group of second fiber electrodes are arranged into a second layer such that the second fiber electrodes are parallel to each other in the second layer; and the second layer is positioned immediately adjacent to the first layer to form electrical connection between the electrodes. This structure prevents occurrence of short-circuiting of a storage battery or a capacitor. Patent Literature 3 also aims at increasing the charging capacity of the battery per unit volume.

Patent Literature 4 discloses a fiber spreading apparatus of an air-flow type, which is capable of spreading an aggregate of fibers, which is to be processed, with high accuracy and efficiency, thereby fabricating a high-quality spread-fiber product. The fiber spreading apparatus disclosed by Patent Literature 4 is intended to uniformly spread an aggregate of fibers in a manner not to cause tangling or cutting of fibers in a fiber bundle.

Patent Literature 5 discloses a method of performing electroplating a bundle of carbon fibers in such a manner that the electroplating is uniformly and continuously performed on each single fiber.

Patent Literature 6 discloses a method of fabricating a metal-oxide-coated carbon fiber. This method allows characteristics of a metal oxide to be maintained, and also allows mechanical characteristics of a carbon fiber, i.e., high strength and high elastic modulus, to be maintained.

CITATION LIST

Patent Literature

PTL 1: Japanese Laid-Open Patent Application Publication No. 2003-317794

PTL 2: Japanese Laid-Open Patent Application Publication No. 2001-110445

PTL 3: Japanese Laid-Open Patent Application Publication No. H8-227726

PTL 4: Japanese Laid-Open Patent Application Publication No. 2002-53266

PTL 5: Japanese Laid-Open Patent Application Publication No. S60-231864

PTL 6: Japanese Laid-Open Patent Application Publication No. 2002-180372

SUMMARY OF INVENTION

Technical Problem

Generally speaking, if a material is made into powder, the surface area of the material is increased significantly. This results in improved chemical reactivity. In this case, however, if a battery active material is used as an electrode, it is very difficult to connect a terminal to each active material powder particle for current collection. Therefore, in general, the powder is mixed with a conductive assistant and a binder and made into slurry. The slurry is applied to a metal foil or impregnated into a porous metal, or dried and press-formed, for example. In this manner, the active material and a current collector are adhered to each other for current collection. An electrode fabricated in this manner is a thick plate electrode. Accordingly, the feature of the powder, i.e., having a large surface area, cannot be taken advantage of, and the diffusion rate of ions or electrons moving within the active material is a rate-limiting factor. For this reason, it is difficult to obtain high-power capability with the electrode.

In the case of a conventional plate electrode, high-power capability can be obtained by reducing the thickness of the electrode. However, if the thickness of the electrode is reduced excessively, a large number of such electrodes need to be stacked in a square-shaped battery casing, or a more elongated electrode needs to be wound up in a cylindrical battery casing. For this reason, the lower limit of the thickness of a high-power electrode is approximately 300 μm. In addition, in a plate electrode, the diffusion rate of moving ions or electrons is a rate-limiting factor. For this reason, there is a limitation in improving high-power capability. Although capacitors are originally superior to batteries in terms of high-power capability, capacitors have a small capacity.

Therefore, as disclosed in Patent Literature 1, a fiber electrode is used, in which a fibrous material having electron conductivity is used as a current collector which serves as a path for ions or electrons, and a thin layer of a battery active material is adhered to the surface of the current collector. The use of such a fiber electrode makes it possible to create a state that is close to a state where each single powder particle of the active material is collecting electric current. Therefore, an electrode with a larger surface area can be fabricated as compared to the conventional art.

A fiber electrode is formed by coating the outer periphery of a thin fiber (a fibrous material) with a thin and uniform active material layer. The diameter of such a single fiber electrode is approximately 100 μm at a maximum. Accordingly, an electrode that is significantly thinner than a conventional plate electrode can be formed. This makes it possible to greatly improve the charging speed and discharging speed of a battery. Assume a case where a sheet-like electrode is formed by arranging fiber electrodes, each of which has a diameter of several μm, such that the fiber electrodes are parallel to each other. In such a case, an electrode with higher density than in a case where an active material is formed on a foil or a foamed base material can be realized. This consequently makes it possible to increase the capacity of a battery or a capacitor per unit volume.

However, considering mass manufacturing of fiber electrodes, it is inefficient if electrodes are fabricated one by one from a fiber having a diameter of approximately several μm. Therefore, although depending on the size and intended use of a battery to fabricate, it is necessary to form several hundreds to several tens of thousands of fibers into electrodes at the same time in order to efficiently fabricate a fiber battery. Moreover, in order to assemble a high-power battery by using fiber electrodes, it is necessary to interpose a thin separator between fiber electrodes, such that the fiber electrodes are arranged with a shortest possible distance therebetween.

The present invention has been made in view of the above conventional technical problems. An object of the present invention is to provide a highly efficient electrical storage device that uses a fiber positive electrode and a fiber negative electrode and in which lithium ion is used as an intercalating species. Another object of the present invention is to provide a method of fabricating the electrical storage device.

Solution to Problem

The inventors of the present invention have found that battery performance is greatly increased and fabrication of fiber electrodes is facilitated by combining a fiber positive electrode that includes an electrically conductive fiber having a surface on which a specific positive electrode active material coating is formed, with a fiber negative electrode that is formed from an electrically conductive fiber. Based on these findings, the inventors arrived at the present invention.

Specifically, the present invention relates to an electrical storage device including:

a fiber positive electrode including an electrically conductive fiber, the fiber having a surface on which a positive electrode active material coating is formed, the positive electrode active material coating containing a transition metal oxide represented by a chemical formula 1 which is $(Li_{1-x}A_x)_a M_b X_c O_d$;

a fiber negative electrode formed from an electrically conductive fiber containing a negative electrode active material;

a separator; and an electrolyte.

In the chemical formula 1, A is at least one kind of alkali metal selected from the group consisting of Na, K, Rb, and Cs;

M is at least one kind of transition metal selected from the group consisting of Ti, V, Cr, Mn, Fe, Co, Ni, Cu, Nb, Mo, Ru, Pd, Ag, Ta, W, Ce, Pr, Sm, Eu, and Pb;

X is at least one kind of typical elements selected from the group consisting of B, Al, Si, P, S, Ga, and Ge; and $0<a\le 6$, $1\le b\le 5$, $0\le c\le 4$, $0<d\le 12$, $0\le a/b\le 4$, and $0\le x\le 0.5$.

The compound represented by the chemical formula 1 may have such a structure that M in the chemical formula 1 is partially replaced by an element such as Sc, Zn, Y, Zr, La, Nd, Gd, Tb, Dy, Ho, Er, Tm, Yb, Lu, Hf, In, or Bi. In the chemical formula 1, a small amount of oxygen deficiency is allowable. In the chemical formula 1, oxygen sites may be partially replaced by a halogen element such as fluorine (F), or by sulfur (S).

Preferably, a separator coating is formed on a surface of the fiber positive electrode and/or on a surface of the fiber negative electrode.

Preferably, a solid electrolyte film is formed on a surface of the fiber negative electrode.

Preferably, the fiber positive electrode and the fiber negative electrode are stacked alternately in such a manner that horizontal end positions of the fiber positive electrode and horizontal end positions of the fiber negative electrode are displaced from each other, and the fiber positive electrode and the fiber negative electrode are press-formed vertically.

Preferably, the fiber positive electrode includes an Al plating coating between the fiber and the positive electrode active material coating.

Preferably, the fiber negative electrode includes a coating of the negative electrode active material and a Cu plating coating or a Ni plating coating between the fiber and a coating of the negative electrode active material.

Preferably, a positive electrode terminal and a negative electrode terminal are disposed at end portions of the press-formed fiber positive and negative electrodes.

Preferably, the fiber positive electrode and the fiber negative electrode are fixed by means of an adhesive.

The electrical storage device may be a unit battery.

A high-capacity battery may be formed by combining a plurality of electrical storage devices, an insulating framework member, and an electrically conductive framing member.

An electrical storage device stacked body (a battery module or a battery stack) may be formed by stacking a plurality of the electrical storage devices either horizontally or vertically.

A high-capacity battery stacked body (a battery module or a battery stack) may be formed by stacking a plurality of the high-capacity batteries either horizontally or vertically.

The present invention further relates to a method of fabricating an electrical storage device comprising the steps of:

(A) obtaining a fiber positive electrode by forming, on a surface of an electrically conductive fiber, a positive electrode active material coating containing a transition metal oxide represented by a chemical formula 1 which is $(Li_{1-x}A_x)_a M_b X_c O_d$;

(B) obtaining a fiber negative electrode from an electrically conductive fiber; and (C) assembling the fiber positive electrode, the fiber negative electrode, a separator, and an electrolyte into the electrical storage device.

In the chemical formula 1, A is at least one kind of alkali metal selected from the group consisting of Na, K, Rb, and Cs;

M is at least one kind of transition metal selected from the group consisting of Ti, V, Cr, Mn, Fe, Co, Ni, Cu, Nb, Mo, Ru, Pd, Ag, Ta, W, Ce, Pr, Sm, Eu, and Pb;

X is at least one main group element selected from the group consisting of B, Al, Si, P, S, Ga, and Ge; and $0<a\le 6$, $1\le b\le 5$, $0\le c\le 4$, $0<d\le 12$, $0\le a/b\le 4$, and $0\le x\le 0.5$.

Preferably, the step (C) includes (D1) forming a separator coating on a surface of the fiber positive electrode and/or on a surface of the fiber negative electrode.

It is also preferred that the step (C) includes (D2) forming a solid electrolyte film on a surface of the fiber negative electrode.

Preferably, the step (C) further includes (E) alternately stacking the fiber positive electrode and the fiber negative electrode in such a manner that horizontal end positions of the fiber positive electrode and horizontal end positions of the fiber negative electrode are displaced from each other, and vertically press-forming the fiber positive electrode and the fiber negative electrode, after the step (D1) or the step (D2).

Preferably, the method further includes (A0) plating the surface of the electrically conductive fiber with Al, prior to the step (A).

Preferably, the method further includes (B0) forming a Cu plating coating or a Ni plating coating on a surface of the electrically conductive fiber and forming a negative electrode active material coating on the plating coating, prior to the step (B).

Preferably, the step (C) includes (F) disposing a positive electrode terminal and a negative electrode terminal at end portions of the press-formed fiber positive and negative electrodes, after the step (E).

Preferably, in the step (E), the fiber positive electrode and the fiber negative electrode are fixed by means of an adhesive.

Preferably, the method further includes: (P1) spreading a fiber tow (fibrous material bundle) prior to the step (A); and (P2) spreading a fiber tow prior to the step (B).

Advantageous Effects of Invention

The electrical storage device according to the present invention has an increased separator surface area and a significantly reduced inter-electrode distance between the fiber positive electrode and the fiber negative electrode. This makes it possible to significantly reduce internal resistance at the time of charging/discharging. Since a separator coating is formed on each single fiber forming the fiber positive electrode and/or the fiber negative electrode, the separator surface area is greatly increased. As a result, the charging speed and discharging speed are greatly improved, and ultrafast charging and large current discharging are realized. Furthermore, if a solid electrolyte film is formed on the surface of the fiber negative electrode, unlike an electrical storage device that uses a liquid as an electrolyte, there is no possibility of electrolyte solution leakage.

According to the method of fabricating the electrical storage device of the present invention, inherent characteristics of fiber electrodes are taken advantage of, and moreover, a large number of fiber positive electrodes and fiber negative electrodes can be efficiently fabricated from a large number of fibers at the same time. This makes it possible to mass-manufacture electrical storage devices that include these fiber electrodes and in which lithium ion is used as an intercalating species.

BRIEF DESCRIPTION OF DRAWINGS

FIGS. 9A to 9D are schematic diagrams each showing an example of arrangement of fiber positive electrodes and fiber negative electrodes.

DESCRIPTION OF EMBODIMENTS

Figure 1:
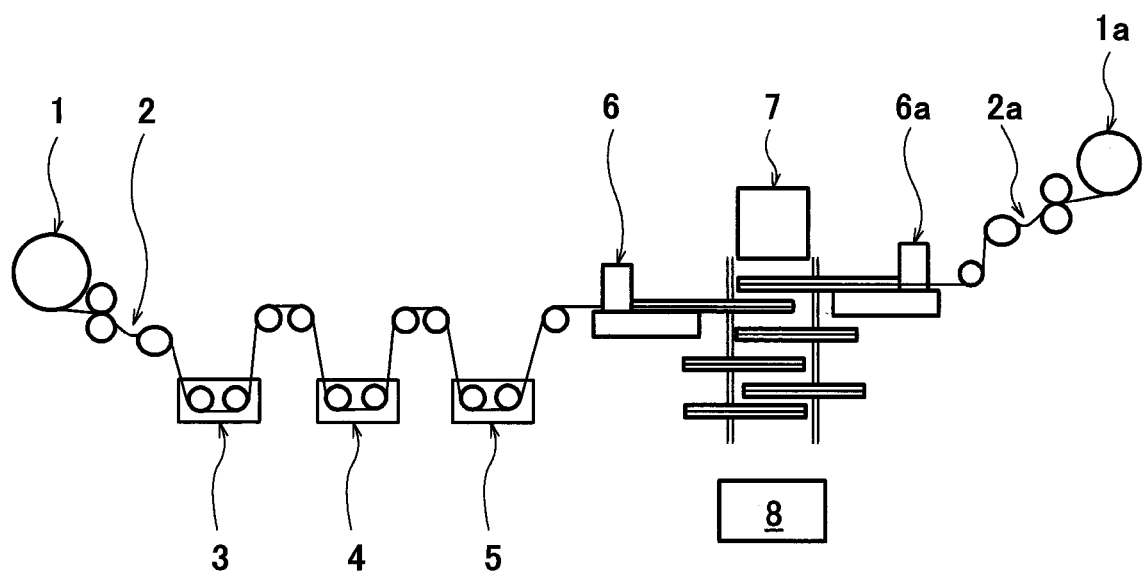
FIG. 1 is a schematic structural diagram showing an example of fabrication equipment used for fabricating a fiber positive electrode and a fiber negative electrode.

Hereinafter, an embodiment of the present invention is described, with reference to the accompanying drawings as necessary. The present invention is not limited by the description provided below.

A method of fabricating an electrical storage device according to the present invention includes the steps of:

(A) obtaining a fiber positive electrode by forming, on a surface of an electrically conductive fiber, a positive electrode active material coating containing a transition metal oxide represented by a chemical formula 1 which is $(Li_{1-x}A_x)_a M_b X_c O_d$;

(B) obtaining a fiber negative electrode formed from an electrically conductive fiber containing a negative electrode active material; and (C) assembling the fiber positive electrode, the fiber negative electrode, a separator, and an electrolyte into the electrical storage device.

In the chemical formula 1, A is at least one kind of alkali metal selected from the group consisting of Na, K, Rb, and Cs;

M is at least one kind of transition metal selected from the group consisting of Ti, V, Cr, Mn, Fe, Co, Ni, Cu, Nb, Mo, Ru, Pd, Ag, Ta, W, Ce, Pr, Sm, Eu, and Pb;

X is at least one kind of typical elements selected from the group consisting of B, Al, Si, P, S, Ga, and Ge; and $0 < a \le 6$, $1 \le b \le 5$, $0 \le c \le 4$, $0 < d \le 12$, $0 \le a/b \le 4$, and $0 \le x \le 0.5$.

The fiber positive electrode and the fiber negative electrode are used as electrodes in the electrical storage device according to the present invention. Here, not a plate-shaped current collector or a foil current collector but a thin electrically conductive fiber is used as a current collector. This makes it possible to fabricate an electrode with greatly improved cycle-life performance and high-power capability.

<Spreading a Fiber Tow>

Preferably, spreading a fiber tow (a fibrous material bundle) is performed prior to the step (A) and the step (B). In this step, a fiber tow is spread and processed into a thin sheet-like shape, and thereby a gap is formed between each fiber. This makes it possible to readily form a thin and uniform active material coating on each fiber. A method used for spreading the fiber tow may be an air flow method in which air is blown against the fiber tow, or a method in which a vacuum pump is used to suck air surrounding the fiber tow.

<Fiber Electrode>

In the step (A), a positive electrode active material coating containing a transition metal oxide represented by the chemical formula 1 is formed on the surface of the electrically conductive fiber. Examples of a transition metal compound corresponding to the chemical formula 1 include $LiNiO_2$, $LiCoO_2$, $LiMnO_2$, $LiFePO_4$, and $LiV_2O_5$.

In the step (B), the fiber negative electrode is obtained from an electrically conductive fiber. If the fiber is made of a negative electrode active material for use in a lithium ion electrode, then the fiber is directly used as the fiber negative electrode. On the other hand, if the fiber is not made of a negative electrode active material for use in a lithium ion electrode, then a coating of a material that is usable as a negative electrode active material for use in a lithium ion electrode is formed on the fiber's surface as a negative electrode active material coating. The coated fiber is used as a fiber negative electrode. That is, in the present invention, the definition of "a fiber negative electrode formed from an electrically conductive fiber containing a negative electrode active material" includes both: a fiber negative electrode made of a negative electrode active material; and a fiber negative electrode that is formed by coating an electrically conductive fiber's surface with a negative electrode active material.

Examples of the negative electrode active material include: carbon materials (activated carbon, graphite, Power Black (product name, available from Osaka Gas Co., Ltd.), and a powder such as KetjenBlack or acetylene black); metal Li; silicon; silicon monoxide; Sn; and Sn alloys. In a case where a carbon fiber is used as a negative electrode fiber, since a carbon fiber is a negative electrode active material, it is not necessary, as mentioned above, to additionally form a negative electrode active material on the carbon fiber's surface. However, a negative electrode active material may be formed on the carbon fiber's surface.

A carbon fiber, a nickel wire, a steel wire, or a metal-coated polyolefin may be used as an electrically conductive fiber. In addition, a fibrous material having insufficient resistance to oxidation or alkalis, such as a cotton thread, a silk thread, or a polyester resin thread, may be coated with a polyolefin-based resin having excellent resistance to electrolyte solution and oxidation, and further coated with a metal. The fibrous material with the coatings is also usable as an electrically conductive fiber. If such a metal-coated fiber is oxidized by an electrolytic method or heat treatment, then carbon or a polyolefin within the fiber is oxidized and decomposed. As a result, a porous metal fiber that is a thin hollow fiber can be obtained. Such a material is also usable as an electrically conductive fiber.

A metal wire is also usable as an electrically conductive fiber. In the case of a battery in which a caustic alkaline aqueous solution is used as an electrolyte solution, a nickel wire or a steel wire may be used as an electrically conductive fiber. In the case of a lithium ion battery, an aluminum wire may be used as a positive electrode fiber, and a copper wire or a nickel wire may be used as a negative electrode fiber.

The diameter of the electrically conductive fiber used in the present invention is not particularly limited. However, in a case where an electrically conductive fiber is used as a current collector, its diameter is determined with reference to the thickness of a conventional nickel positive electrode current collector. Specifically, a positive electrode using a sintered nickel substrate or a positive electrode using a foamed nickel substrate has a thickness of 300 µm or greater. Therefore, it is preferred that the diameter of the electrically conductive fiber used in the present invention is much less than 300 µm. Accordingly, the diameter of each single fiber forming the electrically conductive fiber is preferably 0.1 to 100 µm, and more preferably, 2 to 50 µm.

If the diameter of each single fiber is less than 0.1 µm, the mechanical strength of the single fiber is insufficient. Therefore, there is a risk that the single fibers are cut due to a clamping force when they are bundled together by means of a solderless terminal, or that the single fibers are cut due to the weight of an active material deposited thereon. Further, if the diameter of each single fiber is less than 0.1 µm, its electrical conductivity is low. This may cause a difficulty with uniform deposition of the active material. On the other hand, if the diameter of each single fiber is greater than 100 µm, then the active material deposited on the single fiber tends to be distorted. Accordingly, there is a risk of reduction in cycle-life performance.

A thin tubular coating of an oxide, a hydroxide, or a metal can be uniformly formed on individual fiber current collectors, by using an electrodeposition method, a metal alkoxide hydrolysis process, or an electroplating method. Then, the fiber current collector, on which the thin tubular coating is formed, is exposed to hydrothermal treatment. As a result, a lithiated metal oxide coating is obtained.

For example, causing cathodic polarization in an aqueous solution of a metal salt such as nitrate can be used as an electrodeposition method. Then a metal hydroxide tubular coating is formed on the fiber current collector. A hydroxide or oxide of Ni, Cu, Co, Mn, Fe, V, W, Mo, Re, a rare earth element, Mg, Al, Ca, Zn, or Li can be deposited on a fiber surface with this method. Among these, a fiber on which a hydroxide of Ni, Fe, or Zn is deposited can be, when attached to a terminal, directly used as a fiber positive electrode or fiber negative electrode for use in a battery that uses an alkaline aqueous solution as an electrolyte solution. Also, by obtaining $MnO_2$, a fiber positive electrode for use in a manganese primary battery or alkaline manganese battery can be obtained.

There is also a method of forming a thin oxide coating or thin hydroxide coating by using a metal alkoxide. The metal alkoxide herein refers to a compound, in which the hydrogen of the hydroxyl group of an alcohol molecule is replaced by a metal atom and which is represented by the following general formula: $M(OR)_n$ (M: metal, R: alkyl group, n: the oxidation number of a metal element). Alkali metals, alkaline-earth metals, transition metals, rare earth elements, and various elements in groups 13 to 16 of the periodic table may form metal alkoxides. By hydrolyzing such a metal alkoxide through a reaction with water, a metal oxide layer can be formed on a fiber surface. This method is applicable if it is difficult to obtain an oxide or hydroxide through electrodeposition.

Examples of a metal that can be obtained through electroplating include Cr, Fe, Co, Ag, Au, Zn, Cd, Sn, and Pb in addition to Cu, Ni, and Al mentioned above. An obtained metal coating may be oxidized by performing heat treatment in oxygen, which is another way of forming an oxide coating on a fiber.

In a Sn-plated fiber and a fiber plated with an alloy of Sn and another element such as Cu, Ag, Ni, Au, Co, or Zn, the plated layer is capable of Li intercalation and deintercalation. Therefore, the alloy layer can be used as an active material of a fiber negative electrode for use in a lithium ion battery. Furthermore, if a fiber electrode on which such plating has been performed is exposed to heat treatment under a trace oxygen atmosphere (an inert gas atmosphere where the oxygen concentration is 0.05 to 5 vol %, or a vacuum state of 0.01 to 30 Pa) at approximately 300 to 400° C., then an alloy-oxide composite coating is formed in which the alloy coating (alloy layer) is partially replaced by an oxide. Such a composite coating serves to alleviate, to some extent, volume expansion of Sn that is caused by lithium insertion and extraction. Thus, such a composite coating is effective for improving the cycle durability of a fiber negative electrode.

Fe, Zn, or Cd can be used for a fiber negative electrode of a primary or secondary battery that uses an alkaline aqueous solution as an electrolyte solution. A fiber positive electrode for use in a silver oxide primary battery can be obtained by performing heat treatment on a Ag-plated fiber in an oxidizing atmosphere. A Pb-plated fiber can directly act as a fiber negative electrode for use in a lead battery. A fiber positive electrode for use in a lead battery can be obtained by performing oxidation treatment on the Pb-plated fiber.

The above-described oxide-coated fiber or hydroxide-coated fiber obtained through the electrodeposition, through the heat treatment after the electroplating, or through the hydrolysis process after alkoxide application may be exposed to heat treatment at 100 to 250° C. in a Li ion containing solution in a sealed system under presence of an oxidant or a reductant. In this manner, the transition metal oxide coating that is represented by the chemical formula 1 can be formed on the fiber. By disposing a terminal at the fiber on which the transition metal oxide coating is formed, a fiber positive electrode for use in a lithium ion battery can be obtained.

If it is difficult to form an active material coating on a fiber by using an electroplating method or electrodeposition method, an alternative method may be used, in which a metal alkoxide is used to form a thin oxide coating or thin hydroxide coating. The metal alkoxide herein refers to a compound, in which the hydrogen of the hydroxyl group of an alcohol molecule is replaced by a metal atom and which is represented by the following general formula: $M(OR)_n$ (M: metal, R: alkyl group, n: the oxidation number of a metal element). Alkali metals, alkaline-earth metals, transition metals, rare earth elements, and various elements in groups 13 to 16 of the periodic table may form metal alkoxides. By hydrolyzing such a metal alkoxide through a reaction with water, a metal oxide layer can be formed on a fiber surface.

If a metal oxide formed by a method as described above has an excellent insulating property and ion permeability, then the method can also be used as a method of forming a separator. For example, nickel hydroxide is electrodeposited on a fiber, and then a thin film of zirconia is formed thereon. The resulting zirconia thin film can be used as a separator.

Assume a case where electrodeposition or plating is performed in an electrodeposition bath, electroplating bath, or electroless plating bath in which poorly-soluble fine particles are dispersed. In such a case, the fine particles are co-deposited with an oxide, hydroxide, or metal, and a composite plating layer is obtained, accordingly. In the composite plating layer, the fine particles are dispersed within the oxide, hydroxide, or metal, which is a main component. This method is called co-deposition plating or dispersion plating. For example, in the case of depositing an oxide active material that has relatively low electrical conductivity, the co-deposition plating may be performed by dispersing a metal powder or carbon powder, which acts as a conductive assistant, in a bath. As a result, a fiber electrode is obtained, in which the conductive assistant is dispersed within the active material. Here, a binder agent such as polytetrafluoroethylene (PTFE) may be dispersed within the active material for the purpose of improving the adhesion strength of the active material. A water-soluble polymer such as polyvinyl alcohol (PVA) or carboxymethyl cellulose (CMC) may be used as a surfactant for dispersing a hydrophobic carbon powder within water. In addition, since such a water-soluble polymer is co-deposited with an active material or carbon, the water-soluble polymer is expected to act as a binder. Furthermore, such a water-soluble polymer allows a hydrogen storage alloy for use in a battery, plating of which cannot be readily performed (e.g., $AB_5$ alloy: Mm-Ni—Al—Co—Mn), to be co-deposited with Ni or Cu.

Preferably, the deposition amount of an active material is such that the thickness of an active material coating formed by an electrodeposition method is in the range of 0.5 to 30 μm, and more preferably, in the range of 1 to 10 μm. If an emphasis is put on improving high-power capability, it is preferred that a thin active material coating is formed such that the thickness of the active material coating is 5 μm or less. On the other hand, if an emphasis is put on increasing the capacity, the active material coating may be thicker than 5 μm. If the thickness of the active material coating is less than 0.5 μm, then the battery capacity per unit volume is reduced excessively. As a result, it is necessary to increase the size of a battery container in order to secure a necessary capacity. This is unfavorable. On the other hand, if the thickness of the active material coating is more than 30 μm, the active material coating becomes adhered to the active material coating of an adjacent fiber. This adhesion causes an uneven and thick active material coating, resulting in a lump of the active material coating of which the current collecting ability is insufficient. In a case where the active material coating is an oxide coating and its electrical conductivity is not very high, there arises a problem of low active material utilization.

<Plating Process Performed on Fiber>

In the case of using a fiber as a lithium ion battery current collector, by plating the surface of the fiber with a metal coating, the electrical conductivity of the current collector is improved and battery characteristics such as high-rate charge/discharge capability (rapid charge/discharge capability) and cycle-life performance are improved. In order to render a fiber surface electrically conductive, or in order to improve the electrical conductivity of a fiber surface, a spread fiber may be plated with a metal. The metal used for the plating needs to be chemically stable in the operating voltage range of a lithium ion battery. In this respect, it is preferred that a fiber plated with Al is used as a positive electrode current collector of a lithium ion battery.

In the case of using a fiber as a negative electrode current collector of a lithium ion battery, the fiber is preferably plated with Cu or Ni. It is particularly preferred that the fiber is plated with Cu. In the case of using a carbon fiber for a fiber negative electrode, the carbon fiber itself can be used as a negative electrode, and the carbon fiber which is plated with Cu and thereafter coated with a negative electrode active material can also be used as a negative electrode. In the case of using a fibrous material as a current collector of a battery that uses a caustic alkaline aqueous solution as an electrolyte solution, it is preferred that a fiber for a negative electrode is plated with Ni.

Electrolytic plating with Al is difficult to perform in a plating bath of an aqueous solution type since Al has great affinity for oxygen and the oxidation-reduction potential of Al is lower than that of hydrogen. Therefore, it is preferred that electrolytic plating with Al is performed in a plating bath of a non-aqueous solution type or in a molten salt plating bath. For example, a hydride plating method, in which a plating bath uses ethyl ether as a solvent and $AlCl_3$—$LiAlH_4$ is a main component in the solvent, may be used. Alternatively, a plating bath that uses tetrahydrofuran, benzene, or toluene as a solvent and in which lithium tetrahydridoaluminate is added to aluminum chloride, may be used. Further alternatively, a plating bath that uses a room temperature molten salt can be used. Examples of the room temperature molten salt used in the plating bath include: $AlCl_3$-1-ethyl-3-methylimidazolium chloride ($AlCl_3$-EMIC) room temperature molten salt; $AlCl_{3-1}$-n-butylpyridinium chloride ($AlCl_3$-BPC) room temperature molten salt; and other room temperature molten salts each consisting of $AlCl_3$ and a quaternary ammonium salt that is represented by the following general formula: $[(R^1)_3N+R^2]$ X— (wherein $R^1$ is an alkyl group containing 1 to 12 carbon atoms, $R^2$ is an alkyl group containing 1 to 12 carbon atoms, and X is a halogen atom).

A copper sulfate aqueous solution to which sulfuric acid is added is a main component of a plating solution for electrolytic plating with Cu. A surfactant, unsaturated organic compound, dye, or chloride ion is added to the electrolyte solution in order to obtain a uniform plating coating. It is also effective to increase the sulfuric acid concentration in the solution in order to improve the uniformity of the plating coating. Other known plating baths used for electrolytic Cu plating include a copper cyanide bath and a copper pyrophosphate bath.

A well-known Watts bath, which is a nickel sulfate-based bath, can be used for electrolytic Ni plating. The use of a Watts bath allows a plating coating to be formed with favorable uniformity. Other plating baths that can be used for electrolytic Ni plating include a Wood's nickel strike bath, which is a nickel chloride-based bath, and a sulfamate bath.

Not only an electrolytic plating method but also an electroless plating method may be used. In an electroless method, metal deposition is performed through chemical reduction action. This method does not require application of an electric current. Therefore, with this method, a plating coating having a uniform thickness can be formed on a fiber even if the fiber has insufficient electrical conductivity or the fiber is an insulating fiber having a complex and intricate shape. For example, in the case of an insulating fiber such as a polyolefin fiber, electroless plating with Cu or Ni can be performed on the fiber by pre-treating the fiber with an activating solution containing Pd. Electroless plating is also applicable to a carbon fiber or a steel wire having electrical conductivity. In such a case, a thin metal coating (plating layer) is formed on a fiber tow by electroless plating beforehand. The thin metal coating can be used as an undercoating for forming an electrolytic plating layer with improved thickness uniformity. Furthermore, since the electrical conductivity of the surface of a fiber is improved with this method, plating efficiency at the time of applying electrolytic nickel plating is improved. This makes it possible to realize efficient mass manufacturing.

In the case of performing electroless Ni plating, the following well-known method may be used: a nickel-phosphorus alloy plating (containing 5 to 12% of phosphorus) deposition method in which nickel sulfate is used as a main component of a plating solution and a hypophosphite is added to the solution as a reductant; or a nickel-boron alloy plating (containing 0.2 to 3% of boron) deposition method which utilizes reduction action of dimethylamine borane.

Electroless copper plating can be performed by using an alkaline plating bath that is a copper sulfate-based bath and that contains formaldehyde as a reductant. In order to prevent an occurrence of sedimentation of copper hydroxide in the alkaline solution, Rochelle salt is added to the plating bath as a complexing agent, and EDTA (ethylenediaminetetraacetic acid) sodium salt, citric acid, or tartaric acid is added to the plating bath as a chelating agent. Other than Cu or Ni, a metal such as Co, Au, Ag, Pd, or Sn can be deposited by an electroless plating method.

Known plating methods other than the above-described methods include hot-dip plating, metal spraying, PVD (physical vapor deposition), and CVD (chemical vapor deposition). In a hot-dip plating method or a metal spraying method, Zn, Sn, Pb, or Al, the melting point of which is relatively low, is melted. In a hot-dip plating method, a fiber is immersed in the melted metal, whereas in a metal spraying method, the metal is sprayed on a fiber with high-pressure air. In such a manner, a metal coating (a plating layer) is formed on the surface of the fiber. PVD is a general term referring to methods of vacuum vapor deposition and those of sputtering. In a PVD method, a metal is evaporated in a vacuum and thereby a metal coating is formed on a material's surface. CVD is a general term referring to methods of vapor plating and those of chemical vapor deposition. These plating methods are inferior to electrolytic plating from the standpoint of forming a thin uniform film on individual single fibers. However, any of these plating methods, which do not involve use of an expensive organic solvent or an expensive molten salt, may be used as a method of forming a coating of, for example, Al (a plating layer) on a fiber tow that has been spread into a sheet-like shape.

Instead of forming a plating coating on a fiber surface, a metal fiber or a metal fiber nonwoven fabric may be used as a fiber electrode current collector. One known metal fiber is, for example, aluminum fiber nonwoven fabric (available from Akao Aluminum Co., Ltd.).

A fiber having a porous metal coating layer formed thereon can be fabricated through a method of producing a sintered Ni substrate. Specifically, slurry that is obtained by kneading a mixture of a metal powder and an aqueous solution containing a thickener such as CMC, is applied to a spread fibrous current collector and then dried, and thereafter sintered at a high temperature under a reducing atmosphere or inert gas atmosphere. In this manner, a porous metal layer may be formed on a fiber surface.

Preferably, the amount of the plating is such that the thickness of a plating coating (plating layer) formed by the plating is in the range of 0.1 to 15 μm, and more preferably, in the range of 0.3 to 10 μm. In the case of expecting high-power capability, it is preferred that plating coatings on fiber positive and negative electrodes are thick. Considering economic efficiency, setting the plating coating thickness to approximately 0.3 to 3 μm will suffice from a practical standpoint.

Preferably, after the steps (A) and (B), a step (D1) of forming a separator coating on the surface of the fiber positive electrode and/or the fiber negative electrode is performed. In the step (D1), a thin sheet-like separator used together with a plate electrode in a conventional battery may be formed on the surface of the fiber positive electrode and/or the fiber negative electrode, each of which has been obtained by spreading and processing a fiber tow into a sheet-like shape. Specifically, a polyamide nonwoven fabric or a hydrophilically-processed polyolefin-based nonwoven fabric may be formed as a separator in the case of an alkaline secondary battery. Paper, a porous polyolefin plate, or a fiberglass cloth may be formed as a separator in the case of a lead battery. A polypropylene microporous film or a polyethylene microporous film may be formed as a separator in the case of a lithium ion battery. A battery can be formed by interposing such a separator between the fiber positive electrode and the fiber negative electrode.

Since the electrodes herein are not plate-shaped but fibrous, the surface area of the electrodes is significantly large, and it is expected that the chemical reactivity of the electrodes is greatly improved as compared to plate electrodes. In a battery using an aqueous electrolyte solution, electrolyte solution resistance is relatively low. Accordingly, reactivity is improved by merely using a fiber electrode having a large surface area. Therefore, even if a fiber electrode is used together with a conventional separator or a plate-shaped counter electrode, high-power capability can be obtained to some extent.

However, in the case of aiming at realizing a high-power lithium ion battery, unlike a nickel metal-hydride battery, great improvement in high-power capability cannot be expected when merely using a fiber electrode together with a conventional separator or a plate-shaped counter electrode, because the electrolyte solution resistance of a lithium ion battery is significantly greater than that of a battery using an aqueous electrolyte solution. High-power capability can be effectively improved by forming a stacked body of a fiber positive electrodes and/or a fiber negative electrodes on which a thin separator coating is formed, thereby increasing a separator surface area in addition to an electrode surface area and reducing an inter-electrode distance to reduce a moving distance of lithium ion.

The following method may be applied to form a separator: spreading slurry of an insulating polymer having ion permeability thinly and uniformly on a flat substrate; and forming a polymer coating on the surface of a sheet-like fiber electrode (a fiber positive electrode and/or a fiber negative electrode). For example, a polymer material for a separator is dissolved in a solvent to form slurry. The slurry is applied to a fiber electrode on a flat glass substrate or on a polyethylene sheet which is release-treated on one side. The slurry is then passed through a scraper (e.g., a slit formed by doctor blades), and thereby formed into a coating film having a uniform thickness. Then, the glass substrate is heated, or the fiber electrode to which the slurry is applied is exposed to warm air, so that the slurry is dried within a short period of time. In this manner, a thin film having ion permeability can be formed on the fiber electrode. With this method, a very thin separator coating that is as thin as the fiber electrode can be formed. This makes it possible to significantly reduce an inter-electrode distance.

A separator coating can be formed on the surface of the fiber electrode also in the following manner: the solvent is removed to some extent from the slurry of the polymer material for the separator, which has been applied onto the sheet-like fiber electrode; and the sheet-like fiber electrode is exposed to pressure bonding before the slurry is fully dried. Although depending on the polymer type and the solvent type, the concentration of the polymer in the slurry is as described below. For example, in the case of polyvinyl alcohol (PVA), slurry in which the concentration of PVA is adjusted to 5 to 10 wt % is formed, and a coating of the slurry having a uniform thickness is formed on the sheet-like fiber electrode by using a scraper. Thereafter, at the time of exposing the sheet-like fiber electrode to pressure bonding, it is preferred that approximately 50 to 80 wt % of moisture has been evaporated from the slurry. If the sheet-like fiber electrode is in such a state, there is a low possibility that the sheet-like fiber electrode penetrates the polymer separator coating and is exposed when the fiber electrode is exposed to pressure bonding, and also the adhesion between the polymer separator coating and the sheet-like fiber electrode is maintained at a favorable level.

In the case of low moisture evaporation amount, i.e., a case where the amount of evaporation of moisture from the slurry is less than 50 wt %, the polymer separator coating tends to be damaged at the time of pressure bonding since there is a great amount of residual moisture. If the moisture evaporation amount is more than 80 wt % (i.e., a residual moisture amount is less than 10%), then the polymer separator coating has sufficient strength. In this case, however, adhesion between the sheet-like fiber electrode and the separator coating (polymer coating) is insufficient, because the residual moisture amount is so small that it is insufficient to obtain favorable adhesion.

A thin polymer film may be formed in advance, and the film may be affixed to a fiber surface. In this case, the separator film may be placed on one or both faces of a fiber electrode, and the fiber and the film(s) may be roller-pressed and thereby adhered to each other. The roller pressing may be performed at an ordinary temperature. However, if the roller pressing is performed at such an increased temperature that the polymer is almost softened, then the adhesion between the fiber and the film(s) is increased.

A pressing machine different from a roller pressing machine may be used. For example, a flat hot press machine or a flat cold press machine may be used. In an alternative manner, the fiber and the film(s) may be, after being heated, rolled out by using a cold press machine.

The polymer used as a separator material has ion permeability and insulating property. The polymer can be used without specific restriction so long as the polymer has resistance to oxidation and electrolyte solution. For example, polyvinyl alcohol (PVA), styrene-ethylene-butylene-styrene block copolymer (SEBS), polyvinylidene fluoride (PVdF), polytetrafluoroethylene (PTFE), polyethersulfone (PES), polysulfone (PS), ethylene vinyl acetate (EVA), polypropylene (PP), or polyethylene (PE) can be used as a separator material. In order to improve ion permeability of such a polymer film, the film needs to be formed into a porous film, or a filler needs to be added to the film for improving affinity for an electrolyte solution.

Specifically, one applicable method to form such a porous film is to form an ultrafiltration membrane by immersing, in a solvent having high affinity for the solvent of the slurry, a fiber electrode to which the slurry of the polymer material for the separator is applied. For example, a toluene solution in which SEBS is dissolved is applied to a fiber electrode, which is then immersed in acetone. In this case, SEBS is not dissolved in acetone, but toluene is dissolved in acetone. As a result, a SEBS film is formed, which has a large number of holes formed thereon due to toluene extraction. Similarly, a porous PVA film can be formed by applying a PVA aqueous solution to a fiber electrode and then immersing the fiber electrode in ethanol.

In the case of using a hot pressing machine or cold pressing machine of a flat plate type as described above, if the polymer is heated excessively, then there is a possibility that the softened polymer causes blockage of the holes. For this reason, proper temperature adjustment is necessary.

Another porous film forming method is as follows: a powder of an alkali-soluble oxide such an oxide of silicon, magnesium, calcium, or bismuth is added to the slurry of the polymer material; then a fiber electrode is immersed in the slurry or the slurry is applied to the fiber electrode, and thereby a separator precursor is suitably formed on the electrode; the separator precursor is dried and then the electrode is immersed in a caustic alkaline aqueous solution at 80 to 120° C.; accordingly, the alkali-soluble oxide is dissolved in the caustic alkaline aqueous solution; as a result, a porous polymer film having ion permeability is formed; the caustic alkaline aqueous solution is washed away from the porous polymer film with water; and then the film is dried. In this manner, a porous separator can be obtained.

Preferably, the mass median diameter, D50, of the alkali-soluble oxide added to the slurry of the polymer material is 2 µm or less. The amount of the added oxide is preferably 1 to 50 wt % of the polymer weight. More preferably, the amount of the added oxide is 10 to 30 wt % of the polymer weight. If the amount of the added oxide is less than 1 wt % of the polymer weight, then the film's porosity and affinity for electrolyte solution tend to be insufficient, resulting in decreased ion permeability of the separator. On the other hand, if the amount of the added oxide is more than 50 wt % of the polymer weight, then the strength of the film tends to decrease. Therefore, if a fiber electrode on which such a film is formed and a counter electrode are stacked and pressed together, there is an increased possibility of short-circuiting.

In the case of using PP or PE, solvents in which PP or PE is dissolvable are limited since PP and PE are highly chemical-resistant. A separator film can be formed by using a solution in which PP or PE is dissolved. Also, a separator film may be formed in the following alternative method: PP or PE resin is melted at a temperature higher than or equal to its melting point (140 to 170° C. or higher in the case of PP, and 100 to 115° C. or higher in the case of PE); an alkali-soluble oxide such as $SiO_2$ is added to the melted resin; and then, a film is formed on a substrate by passing the resin through a scraper. Before the resin is cooled down and solidified, a fiber electrode is adhered to the resin, and thereby a stack of the fiber electrode and the separator is formed. Then, $SiO_2$ is dissolved in a caustic alkali. In this manner, a microporous film may be formed.

In the case of an alkaline secondary battery, a separator coating may be formed by using, for example, PVA which is water-soluble and from which a film can be readily formed. A separator coating may be formed also by forming a porous film such as a PP film or PE film on a fiber electrode for use in a lithium ion battery.

An electrodeposition method is also applicable as a separator forming method. In this method, an oxide and/or a polymer that are in powder form are dispersed in a solvent. Then, a fiber electrode and a counter electrode are immersed in the solvent, and a DC voltage is applied thereto, so that the oxide and/or the polymer are adhered to the fiber electrode. The solvent used here is an organic solvent such as acetone or ethanol. The amount of the oxide and/or the polymer added to the solvent is preferably 0.1 to 100 g/L, and more preferably, 1 to 50 g/L. The oxide's particle diameter is preferably 0.01 to 20 µm, and more preferably, 0.05 to 5 µm. If the particle diameter is small, a dense film can be formed. However, if the particle diameter is less than 0.01 µm, an inter-particle gap tends to become small, which tends to cause low ion permeability. On the other hand, if the particle diameter is more than 20 µm, the gap tends to become large, which increases a possibility that the fiber electrode comes into contact with the fiber of the counter electrode, resulting in short-circuiting.

Generally speaking, the DC voltage applied here is 10 to 350 V. A period over which the DC voltage is applied is 30 seconds to 10 hours. The thickness of the separator film formed by the electrodeposition method is preferably 1 to 100 µm, and more preferably, 5 to 30 µm. Conditions for forming a thin separator film having a uniform thickness depend on the type and amount of the oxide powder and/or the polymer to be added. Accordingly, it is necessary to properly adjust the amount of these additives, the DC voltage to be applied, and the period over which the DC voltage is applied.

The electrolyte used in the electrical storage device according to the present invention can be used without specific restriction, so long as the electrolyte can be used in a lithium ion battery. A solid electrolyte that has an insulating property and lithium ion conductivity may be deposited on a fiber negative electrode to form a solid electrolyte film. This prevents a leakage of electrolyte solution, and makes it possible to reduce the size of the electrical storage device. Preferably, a solid electrolyte for use in a lithium ion battery, such as $Li_3PO_4$ is electro-deposited on the surface of a negative electrode fiber. There is a possibility that a solid electrolyte alone does not provide sufficient electrical conductivity. Therefore, in the case of using the electrical storage device according to the present invention for high-power applications, it is more preferred that a solid electrolyte is formed on a fiber and then an electrolyte solution is injected thereinto. $Li_3PO_4$ is deposited on the surface of a fiber negative electrode, by immersing the fiber negative electrode in an aqueous solution in which lithium nitrate ($LiNO_3$) and sodium phosphate ($NaH_2PO_4$) are mixed, and performing electrodeposition treatment thereon. Here, by further performing hydrothermal treatment in a bath in which lithium hydroxide (LiOH) and sodium hypochlorite (NaClO) are mixed, a lithium loss from the $Li_3PO_4$ coating can be reduced.

$Li_3PO_4$ has an excellent insulating property and excellent lithium ion electrical conductivity. Therefore, if a carbon fiber is coated with $Li_3PO_4$, then the $Li_3PO_4$ coating can act as both a separator and an electrolyte. A carbon fiber can directly act as a fiber negative electrode for use in a lithium ion battery. Therefore, a stack of a fiber negative electrode and a separator can be obtained by coating a carbon fiber with $Li_3PO_4$. Here, by adding aluminum nitrate or nickel nitrate to an electrolytic bath, $Li_{3-x}M_xPO_4$ (M=Al or Ni), in which Li in $Li_3PO_4$ is partially replaced by Al or Ni, can be obtained. This compound indicates much better ion conductivity than $Li_3PO_4$ in which Li is not partially replaced by Al or Ni. Alternatively, $Li_3PO_4$ or $Li_{3-x}M_xPO_4$ may be deposited on a fiber negative electrode after the fiber negative electrode is plated with a copper alloy or a tin alloy. In this case, $Li_3PO_4$ or $Li_{3-x}M_xPO_4$ is deposited on a plating coating (plating layer).

In the above method, a solid electrolyte coating can be uniformly formed around individual fiber negative electrodes. Therefore, the method can obtain a larger separator surface area as compared to a method in which a thin separator film is affixed to the entirety of a sheet-like fiber electrode. Moreover, a fiber negative electrode, a separator, and an electrolyte can be formed at the same time by depositing a solid electrolyte coating on a carbon fiber. This makes it possible to reduce the working processes and the size of the electrical storage device. Furthermore, a combination of a solid electrolyte and an electrolyte solution may be used as an electrolyte.

When a separator surface area is increased, the diffusion speed of lithium ion which is an intercalating species is increased, accordingly. Therefore, it is preferred that a separator is formed on the surface of both a fiber positive electrode and a fiber negative electrode. Instead of forming a separator on a fiber electrode surface, a sheet-like separator may be interposed between a sheet-like fiber positive electrode and a sheet-like fiber negative electrode.

<Active Material of which Coating Formation is Difficult>

If forming an active material coating on a fiber by using an electroplating or electrodeposition method is difficult, it is conceivable to apply a co-deposition plating method, or to apply the above-described method in which metal alkoxide application and hydrolysis are performed. In addition, other than these methods, a method used for forming a separator on a fiber electrode surface can be applied. Such a method is applicable to, for example, a case where an active material is silicon (Si) or silicon monoxide (SiO) which acts as a negative electrode of a lithium ion battery, or a case where an active material is $V_2O_5$ or sulfur which acts as a positive electrode of a lithium ion battery. A method of forming a separator on a fiber electrode surface as described above is also applicable to a metal oxide used as a capacitor electrode material (ruthenium oxide or iridium oxide) and to a hydrogen storage alloy used as a negative electrode material of a nickel metal-hydride battery.

To be specific, a fine powder of a positive electrode active material or a negative electrode active material is mixed into a solvent such as water together with a binder, a thickener, or a conductive assistant, and thereby slurry is formed. The slurry is applied to a fiber on a flat glass substrate or on a polyethylene sheet which is release-treated on one side. The slurry is then passed through a thin hole such as a slit formed by doctor blades or a die, and thereby formed into a coating film having a uniform thickness. Then, the glass substrate is heated, or the fiber to which the slurry is applied is exposed to warm air, so that the slurry is dried within a short period of time. In this manner, a positive electrode active material coating or a negative electrode active material coating, which is a thin coating, can be formed on the fiber. Although the fiber in this state can act as a fiber electrode, press forming may be further performed on the fiber. The press forming allows adhesion between the active material and the fiber which acts as a current collector to be improved.

<Stack of Fiber Positive Electrode, Separator, and Fiber Negative Electrode>

A fiber electrode assembly can be formed by alternately stacking a fiber positive electrode, a separator, and a fiber negative electrode in such a manner that their horizontal end positions are displaced from each other. In a case where fiber positive electrodes and fiber negative electrodes are formed such that a separator coating is formed on each fiber positive electrode and/or each fiber negative electrode, one fiber electrode and another fiber electrode acting as a counter electrode of the one fiber electrode are stacked alternately and then pressed together. In this manner, an electrode assembly formed of fiber positive electrodes, separators, and fiber negative electrodes is obtained. At the time of stacking the fiber electrodes, end positions of the respective fiber positive electrodes are displaced, by 1 to 5 mm, from end positions of the respective fiber negative electrodes. This makes it easy to form terminals.

A block-shaped fiber electrode assembly can be obtained by performing press forming on a stack of a sheet-like fiber positive electrode and a sheet-like fiber negative electrode, each of which is obtained by spreading a fiber tow. Preferably, an adhesive is thinly applied to the positive electrode and/or the negative electrode prior to stacking them if it is desired to increase the adhesion between the fiber positive electrode and the fiber negative electrode. The adhesive used here can be used without specific restriction, so long as the adhesive does not reduce the electrode performance, separator performance, or electrolyte solution performance. Even if the adhesive leaks into the electrolyte solution, it does not cause a problem so long as the leakage into the electrolyte solution occurs after the fiber electrode assembly has been fixed in a battery casing. In the case of forming a lithium ion battery, a solution in which polyvinylidene fluoride (PVdF) is dissolved in N-methyl-2-pyrrolidone (NMP) may be thinly applied to fiber electrodes.

When forming terminals of the press-formed fiber electrode assembly, the terminals can be formed by welding metal plates to positive and negative electrode sides, respectively, of the electrode assembly or by bringing metal plates into contact with, and then pressing the metal plates against, the fiber electrode assembly from both the sides. However, in the case of bringing the metal plates as terminals into contact with an electrode, if the sheet-like fiber positive electrode and the sheet-like fiber negative electrode are in a simply stacked state, then there is a possibility that a metal plate also comes into contact with a counter electrode, causing short-circuiting. In order to prevent such short-circuiting, it is preferred to use the following method: a positive electrode terminal portion and a negative electrode terminal portion are sealed with resin; thereafter, the resin is ground by a cutter or a grinder until the positive electrode terminal portion and the negative electrode terminal portion are exposed; and metal plates are held to the exposed positive electrode and negative electrode terminal portions, respectively, to perform pressing from both sides. The resin used here can be used without specific restriction, so long as the resin has excellent resistance to electrolyte solution and an excellent insulating property. The above-described polymer material having an excellent insulating property, or a commercially available synthetic adhesive having excellent resistance to electrolyte solution and an excellent insulating property, may be used as the resin.

The press-formed fiber electrode assembly is inserted in a battery casing, and an electrolyte solution is injected thereinto. In this manner, a fiber battery or a fiber capacitor can be formed.

(1) Fiber Electrode Fabrication Equipment 1

FIG. 1 is a schematic structural diagram showing an example of fabrication equipment used for fabricating a fiber positive electrode and a fiber negative electrode. In FIG. 1, the reference sign 1 denotes a winding roller around which a tow of multiple fibers is wound in a rolled-up manner; the reference sign 2 denotes a fiber spreading apparatus configured to spread a fiber aggregate, that is, the tow of multiple fibers, in preparation for a next step; the reference sign 3 denotes a plating bath; the reference sign 4 denotes an electrolytic bath; the reference sign 5 denotes an alkali tank; the reference sign 6 denotes a separator coating formation apparatus; the reference sign 7 denotes a pressurizing cutter configured to cut a fiber positive electrode and a fiber negative electrode while stacking and press-forming the fiber positive electrode and the fiber negative electrode, at least one of which has a separator coating formed thereon; the reference sign 8 denotes a positive and negative electrode terminal formation apparatus; the reference sign 1a denotes a winding roller around which a tow of multiple carbon fibers is wound in a rolled-up manner; the reference sign 2a denotes a fiber spreading apparatus configured to spread a carbon fiber aggregate, that is, the tow of multiple carbon fibers, in preparation for a next step; and the reference sign 6a denotes a separator coating formation apparatus. The fiber spreading apparatuses 2 and 2a have the same structure, and the separator coating formation apparatuses 6 and 6a have the same structure.

The fiber unwound from the roller 1, which is to be used as a positive electrode current collector, is immersed in a plating solution in the plating bath 3. As a result, a plating coating is formed on the surface of the fiber. The plating solution that is adhered to the fiber is dried or removed, and thereafter, the fiber with the plating coating formed thereon is immersed in an electrolyte solution within the electrolytic bath 4 and then further immersed in an alkaline aqueous solution within the alkali tank 5 where the fiber is exposed to hydrothermal treatment. For example, if a manganese nitrate ($Mn(NO_3)_2$) aqueous solution is used as the electrolyte solution, then $Mn_3O_4$ and $Mn(OH)_2$ are deposited on the plating coating. Thereafter, hydrothermal treatment is performed by using a LiOH/NaClO aqueous solution as the alkaline aqueous solution. As a result, $Mn_3O_4$ and $Mn(OH)_2$ are transformed into $LiMn_2O_4$ which is a positive electrode active material. A fiber having a $LiMn_2O_4$ coating formed on its surface can act as a fiber positive electrode.

On the other hand, in a case where the fiber unwound from the roller 1a, which is to be used as a negative electrode current collector, is a carbon fiber, the carbon fiber can directly act as a fiber negative electrode.

The fiber positive and negative electrodes thus obtained are sequentially conveyed to the separator coating formation apparatuses 6 and 6a and to the pressurizing cutter 7, so that the fiber positive and negative electrodes are stacked alternately in such a manner that their horizontal end positions are displaced from each other. Thereafter, the stacked fiber positive and negative electrodes are press-formed vertically, and terminals are disposed at the positive and negative electrode sides of the stack, respectively, by the terminal formation apparatus 8.

(2) Fiber Electrode Fabrication Equipment 2

Figure 2:
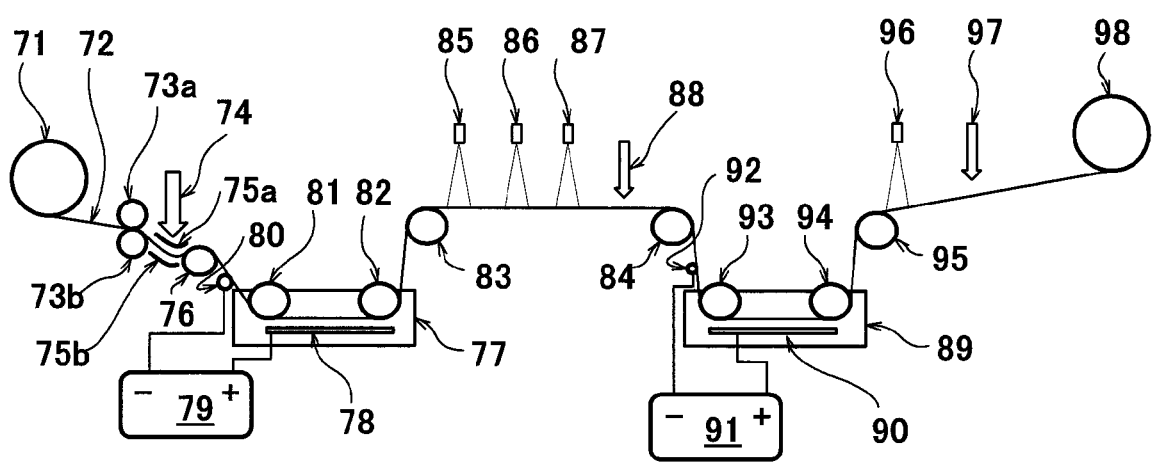
FIG. 2 is a schematic structural diagram showing another example of fabrication equipment used for fabricating a fiber positive electrode and a fiber negative electrode.

FIG. 2 is a schematic structural diagram showing an example of fabrication equipment used for fabricating a fiber positive electrode. In FIG. 2, the reference sign 71 denotes a winding roller around which a fiber tow 72 formed of 12000 fibers (single fiber diameter: 6 μm) is wound in a rolled-up manner. The fiber tow 72 is unwound from the winding roller 71 and passes through a pair of upper and lower guide rollers 73a and 73b. Then, compressed air 74 compressed by a compressor (not shown) is blown against the fiber tow 72. As a result, the fiber tow is spread, so that the width thereof is increased from 1 cm, which is the original width, into 6 cm. The reference signs 75a and 75b denote air diffuser plates for diffusing the compressed air in the width direction of the fiber tow 72. The air diffuser plates 75a and 75b have the same function as air diffuser plates 15a and 15b in FIG. 3.

The fiber tow 72, after being spread, reaches a plating bath 77 through a roller 76. A metal plate 78 having a thickness of approximately 2 mm is placed at the bottom of the plating bath 77. The metal plate 78 is connected to a positive electrode terminal of a DC power supply 79. A negative electrode terminal of the DC power supply 79 is in contact with the fiber tow 72 via a roller 80. The fiber tow 72 in the plating bath 77 is moved out of the bath through rollers 81 and 82. At positions between rollers 83 and 84, a spray 85 sprays acetone, a spray 86 sprays ethanol, and a spray 87 sprays ion-exchanged water, on the fiber tow 72. Thereafter, the fiber tow 72 is dried by air 88 blown from a fan (not shown), and then reaches an electrolytic bath 89.

The electrolytic bath 89 is filled with a plating solution used for active material electrodeposition. A metal plate 90 having a thickness of approximately 2 mm is placed at the bottom of the electrolytic bath 89. The metal plate 90 is connected to a positive electrode terminal of a DC power supply 91. A negative electrode terminal of the DC power supply 91 is in contact with the fiber tow 72 via a roller 92. The fiber tow 72 in the electrolytic bath 89 is moved out of the cell through rollers 93 and 94. After passing through a roller 95, the fiber 72 is washed with water by being exposed to mist steam sprayed from a spray 96. After being dried by air 97 blown from a fan (not shown), the fiber tow 72 is wound around a reel roller 98.

Example 1

A fiber positive electrode for use in a lithium ion secondary battery was fabricated by using the fiber electrode fabrication equipment shown in FIG. 2. In the step of fabricating the fiber positive electrode (Step (A)), two acrylic water tanks were prepared. The first water tank is an aluminum plating bath (containing ($AlCl_3$-EMIC) room temperature molten salt, in which the molar ratio of $AlCl_3$ to EMIC is 2:1), and the second water tank is a manganese nitrate bath (1 mol/L) used for manganese hydroxide electrodeposition.

First, a tow of PAN-based carbon fiber that is formed of rolled-up 12000 fibers bundled together (single fiber diameter: 6 μm) was loosened between two guide rollers and air compressed by a compressor was blown against the fiber tow. As a result, the carbon fiber tow was spread uniformly, so that the width thereof was increased from 1 cm, which is the original width, into 6 cm. The carbon fiber tow was then immersed in the aluminum plating bath. An aluminum plate having a thickness of 2 mm was placed at the bottom of the water tank of the aluminum plating bath and connected to a positive electrode terminal. The carbon fiber was held between metal guide rollers connected to a negative electrode terminal. $AlCl_3$-1-ethyl-3-methylimidazolium chloride ($AlCl_3$-EMIC) room temperature molten salt was used for the aluminum plating bath. This molten salt was obtained by mixing $AlCl_3$ and EMIC in a molar ratio of 2:1.

Next, a reel roller was rotated at a speed of 10 cm/min to wind the fiber tow. While the rotation, electrolytic plating was performed on the fiber tow for ten minutes with a current density of 50 mA/cm². A fiber of the fiber tow on which the electrolytic plating had been performed was observed with an optical microscope. Through the observation, it was confirmed that an Al plating coating (Al plating layer) having a thickness of approximately 1 μm was formed.

A spray was used to spray acetone on the Al-plated fiber tow, and thereby the molten salt adhered to the fiber tow was washed away. Next, the fiber tow was washed, by spraying ethanol thereon and then further spraying ion-exchanged water thereon. Thereafter, the fiber tow was dried.

In the second water tank, electrodeposition was performed in the manganese nitrate bath. As a result, a manganese oxide ($Mn_3O_4$) layer on the fiber having a thickness of approximately 5 μm was obtained. Here, the reel roller was rotated again at a speed of 10 cm/min. While the rotation, electrodeposition was performed on the fiber tow for ten minutes with a current density of 50 mA/cm². The fiber tow on which the electrolytic process had been performed was washed with water by using a spray. The fiber tow was then dried and wound around the reel roller.

A lithium hydroxide (LiOH) aqueous solution was prepared, to which three oxidation equivalents of sodium hypochlorite (NaClO) were added (sodium hypochlorite: 0.08 mol/liter) per equivalent of $Mn_3O_4$ formed on the carbon fiber current collector. The fiber tow on which the electrolytic process had been performed was unwound from the reel roller and then immersed in the lithium hydroxide aqueous solution to which sodium hypochlorite was added. Then, hydrothermal treatment was performed under the condition of 110° C. for 20 hours. Thereafter, the hydrothermal-treated fiber tow was washed with water and dried under a reduced pressure at 110° C. for 24 hours or longer. In this manner, a fiber positive electrode for use in a lithium ion battery was obtained (positive electrode active material=$LiMn_2O_4$).

(3) Fiber Electrode Fabrication Equipment 3

Figure 3:
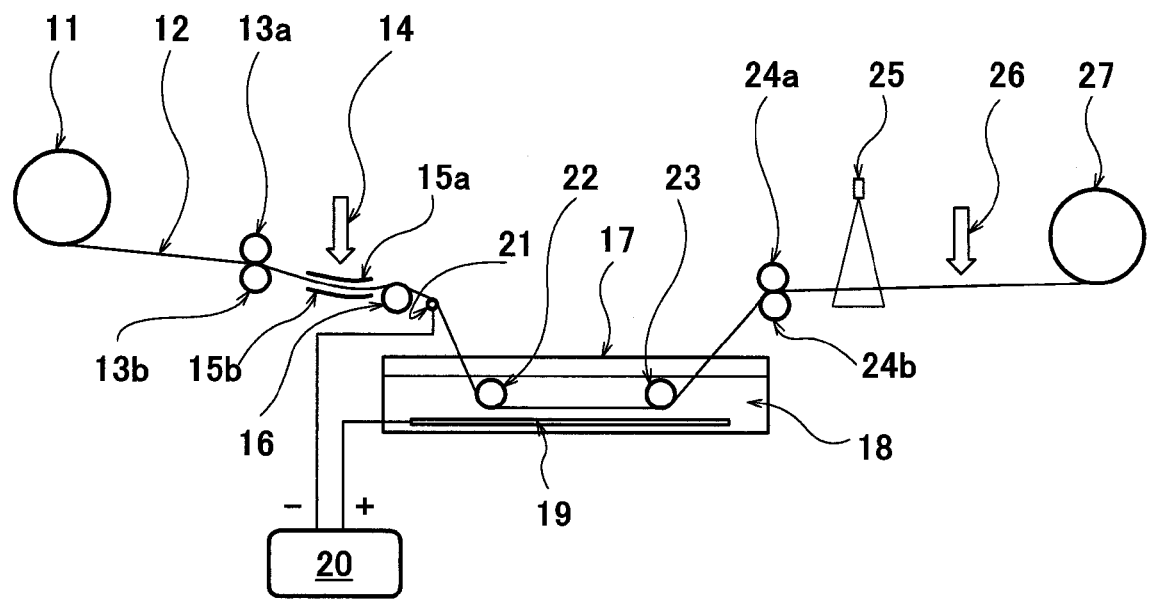
FIG. 3 is a schematic structural diagram showing yet another example of fabrication equipment used for fabricating a fiber positive electrode and a fiber negative electrode.

FIG. 3 is a conceptual diagram showing another example of fabrication equipment used for fabricating a fiber positive electrode and a fiber negative electrode. In FIG. 3, the reference sign 11 denotes a winding roller around which a fiber tow is wound in a rolled-up manner. A fiber tow 12 is unwound from the winding roller 11 and passes through a pair of upper and lower guide rollers 13a and 13b. Then, compressed air 14 compressed by a compressor (not shown) is blown against the fiber tow 12. As a result, the fiber tow is spread, so that the width thereof is increased from 1 cm, which is the original width, to 5 cm. The reference signs 15a and 15b denote air diffuser plates for diffusing the compressed air in the width direction of the fiber tow. The air diffuser plates are each provided with a plurality of comb-like slits so that the compressed air 14 will be uniformly applied to the fiber tow in the width direction.

The fiber tow 12, after being spread, reaches an electrolytic bath 17 through a roller 16. The electrolytic bath 17 is filled with an electrolyte solution 18 such as a nickel nitrate aqueous solution. Preferably, a metal plate 19 is placed at the bottom of the electrolytic bath 17. The metal plate 19, which is a nickel plate, is connected to a positive electrode terminal of a DC power supply 20. A negative electrode terminal of the DC power supply 20 is in contact with the fiber tow 12 via a roller 21. The fiber 12 in the electrolytic bath 17 is moved out of the bath through rollers 22 and 23. The fiber tow 12 further passes through a pair of upper and lower guide rollers 24a and 24b. Thereafter, a spray 25 sprays mist steam on the fiber tow 12. The fiber tow 12 is washed with the steam sprayed thereon, and then dried by air 26 blown from a fan (not shown). Thereafter, the fiber tow 12 is wound around a reel roller 27.

Example 2

A fiber electrode fabrication equipment similar to the one shown in FIG. 3 was used to form a separator coating on the surface of a carbon fiber. The carbon fiber was thus formed into a fiber negative electrode for use in a lithium ion secondary battery. The carbon fiber used in this example is the same as the carbon fiber used in Example 1. An acrylic water tank was filled with an electrolyte solution for use in $Li_3PO_4$ deposition. The electrolyte solution was prepared by dissolving lithium nitrate ($LiNO_3$) and a sodium phosphate ($NaH_2PO_4$) at rates of 0.1 mol/L and 0.02 mol/L, respectively, in ion-exchanged water. Since carbon is usable as a negative electrode for use in a lithium ion battery, the carbon fiber can be directly used as a fiber negative electrode. Since $Li_3PO_4$ has an insulating property and lithium ion conductivity, a $Li_3PO_4$ coating on a carbon fiber can act as both a separator and an electrolyte. A reel roller was rotated at a speed of 5 cm/min to wind the fiber tow. While the rotation, an inter-electrode voltage was maintained at 7V and electrodeposition was performed on the fiber tow for ten minutes. As a result, a $Li_3PO_4$ coating as a negative electrode active material having a thickness of approximately 10 μm was deposited on the fiber.

(4) Formation of Separator on Fiber Electrode Surface

Figure 4:
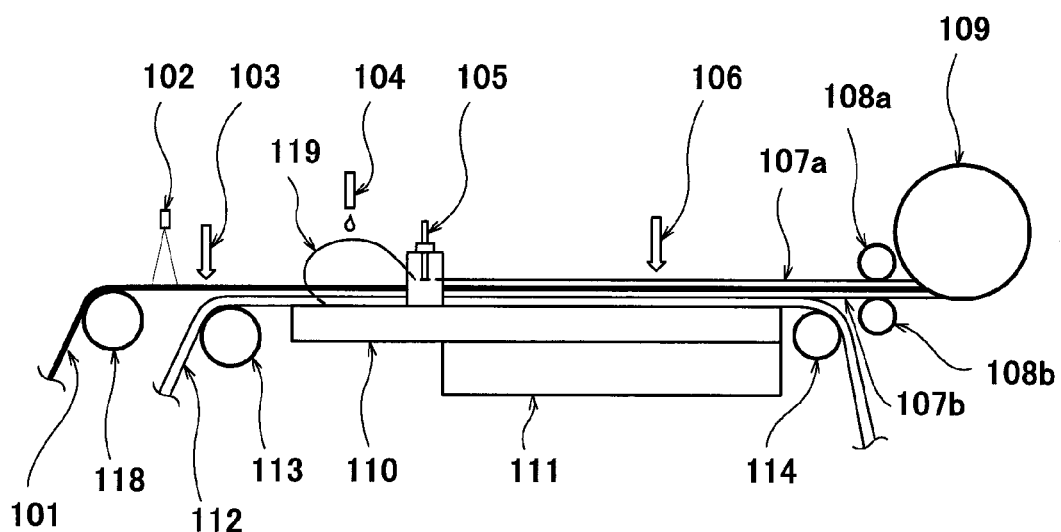
FIG. 4 is a schematic structural diagram showing an example of a separator coating formation apparatus configured to form a separator coating on a fiber electrode surface.

An apparatus as shown in FIG. 4 can be used to form a separator on a fiber electrode surface. In FIG. 4, the reference sign 101 denotes a fiber electrode (a fiber positive electrode or a fiber negative electrode); the reference sign 102 denotes a spray configured to spray mist steam; the reference sign 103 denotes air blown from a fan (not shown); the reference sign 104 denotes a dripping device configured to drip polymer slurry for use in forming a separator coating; the reference sign 105 denotes a scraper configured to scrape away the slurry that remains excessively on the fiber electrode; the reference sign 106 denotes warm air; the reference signs 108a and 108b denote pressing rollers configured to press slurry coatings 107a and 107b which have been applied to the upper and lower faces of the fiber electrode 101 which has a sheet-like shape; the reference sign 109 denotes a reel roller configured to reel in the sheet-like fiber electrode on which the separator coatings have been formed; the reference sign 110 denotes a glass substrate; the reference sign 111 denotes a heating device which is an electric heater provided at the glass substrate 110; and the reference sign 112 denotes a polyester sheet which is release-treated on its external side (i.e., the side facing the sheet-like fiber electrode 101). The polyester sheet 112 is an endless sheet which circulates through rollers 113 and 114 and also through a plurality of rollers which are not shown.

Figure 5:
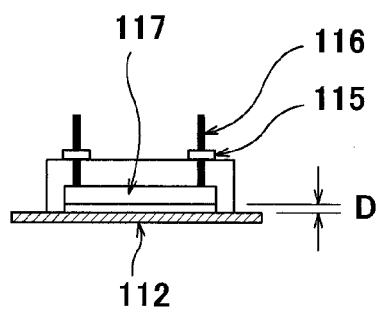
FIG. 5 is a front view of a scraper which is included in the separator coating formation apparatus of FIG. 4.

FIG. 5 is a front view of a scraper which is included in the separator coating formation apparatus of FIG. 4. As shown in FIG. 5, the scraper 105 allows adjustment of a distance D between a scraping plate 117 and the polyester sheet 112 through adjustment of the vertical position of a bolt 116 screwed in a nut 115. To be specific, the separator slurry dripped from the dripping device 104 falls on the polyester sheet 112, and the thickness of the slurry to be applied to the upper and lower faces of the sheet-like fiber 101 can be adjusted by adjusting the distance D.

FIG. 5 shows a method in which the polymer slurry for forming a separator coating is dripped from the slurry dripping device 104 onto the fiber electrode 101 which moves horizontally, and thereby a separator coating is formed on the fiber electrode 101. However, as an alternative, a wetted-wall method or a spray method may be used. Further alternatively, the polymer slurry for forming a separator coating can be applied to the fiber electrode 101 while the fiber electrode 101 is moving diagonally or vertically. Also in this case, a dripping method, a wetted-wall method, or a spray method may be used. Furthermore, the use of the scraper 105 is not essential. By suitably selecting slurry application conditions, a separator coating can be formed even without the use of a scraper.

Figure 6:
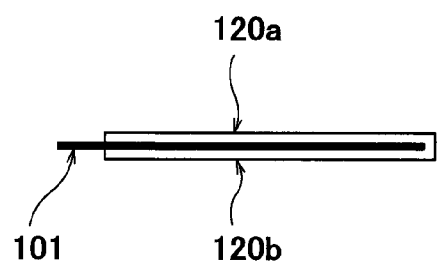
FIG. 6 briefly shows a structure of a fiber positive electrode and that of a fiber negative electrode.

In the apparatus shown in FIG. 4, mist steam is sprayed by the spray 102 on the sheet-like fiber electrode 101 which is fed through a roller 118, and thereby the sheet-like fiber electrode 101 is washed. Then, the air 103 is blown against the fiber electrode 101, and thereby the fiber electrode 101 is dried (however, the drying process may be unnecessary depending on the type of the active material). Next, onto the fiber electrode 101, the dripping device 104 drips a polymer for use in forming a separator coating, such as melted polypropylene to which $SiO_2$ is added. The melted polymer forms a liquid pool 119 near the entrance side of the scraper 105. This increases a possibility that the liquid pool 119 forms a uniform slurry film on the sheet-like carbon fiber 101 after the fiber passed through the scraper. Since PP and PE are readily cooled down and solidified at ordinary temperatures, the glass substrate 110 is heated by the heating device 111. Moreover, the warm air 106 is blown against the polymer film on the fiber electrode 101. This prevents the polymer film from being quickly cooled down and solidified during a period of a few minutes to approximately ten minutes before the polymer film reaches the reel roller 109 after exiting from the scraper 105. This facilitates shaping of the polymer film into a uniform thickness. In addition, the pressing rollers 108a and 108b effectively press the polymer film. As a result, as shown in FIG. 6, separator coatings 120a and 120b are formed on the surface of the fiber electrode 101. The fiber electrode 101 on which the separator coatings have been formed is immersed in a caustic alkaline aqueous solution that has been heated to 80 to 120° C. As a result, $SiO_2$ is dissolved in the alkaline solution, and thereby a porous PP separator film is formed.

Figure 7:
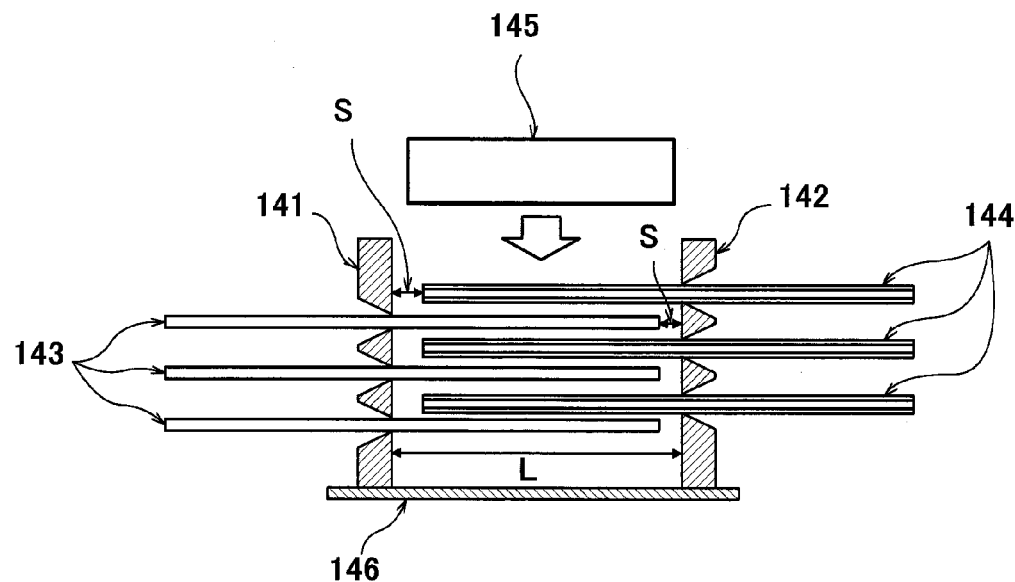
FIG. 7 is a schematic structural diagram showing a pressurizing cutter configured to cut fiber positive electrodes and fiber negative electrodes while stacking and press-forming them.

(5) Fabrication of Stack of Fiber Positive Electrode and Fiber Negative Electrode FIG. 7 is a schematic structural diagram showing a pressurizing cutter configured to stack and press-form fiber positive electrodes and fiber negative electrodes, and to cut away both ends of the stack for shaping. Preferably, the fiber positive electrodes or the fiber negative electrodes, have a separator coating formed thereon. In FIG. 7, a separator is formed on the surface of each fiber positive electrode, and thus fiber positive electrode/separator stacked bodies 144 (i.e., fiber positive electrodes each coated with a separator coating) are formed. In FIG. 7, a left side die 141 and a right side die 142 are each provided with slits that are vertically spaced apart from each other and formed at regular intervals. These slits are formed such that the slits of the left side die 141 and the slits of the right side die 142 are vertically uneven.

As shown in FIG. 7, fiber negative electrodes 143 are inserted in the slits of the left side die 141, and fiber positive electrode/separator stacked bodies 144 are inserted in the slits of the right side die 142. A gap S is formed between the inner wall of the left side die 141 and end portions of the stacked bodies 144, and between the inner wall of the right side die 142 and end portions of the fiber electrodes 143, such that the insertion length of each fiber electrode or stacked body is shorter than a distance L between the inner wall of the left side die 141 and the inner wall of the right side die 142. As a result, positions of end portions of the fiber positive electrode/separator stacked bodies and positions of end portions of the fiber negative electrodes do not coincide with each other in the vertical direction. This makes it easy to form terminals in a step performed afterward.

Figure 8A:
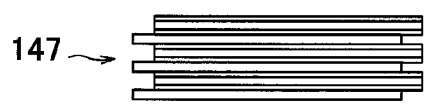
FIGS. 8A to 8C illustrate a structure of a fiber electrode stack.

A cutter 145 is lowered to cut away edges of the fiber positive electrode/separator stacked bodies and the fiber negative electrodes and to press a stack of the fiber positive electrode/separator stacked bodies and the fiber negative electrodes against a fixed base 146. As a result, a fiber electrode stack 147 as shown in FIG. 8A is obtained. FIG. 8A shows the fiber electrode stack 147 which is formed as a result of stacking three sheet-like fiber positive electrode/separator stacked bodies and three sheet-like fiber negative electrodes. However, the number of sheet-like fiber positive electrodes and sheet-like fiber negative electrodes to be stacked may be varied as necessary.

Example 3

A stack of fiber positive electrodes and fiber negative electrodes was fabricated by using the pressurizing cutter shown in FIG. 7. Fiber positive electrodes of Example 1 were inserted through the die 142. Fiber negative electrodes of Example 2, on each of which a $Li_3PO_4$ coating is formed and the $Li_3PO_4$ acts as both a solid electrolyte and a separator, were inserted through the die 141. The insertion length of each of the fiber electrodes inserted through both the dies was designed to be 3 mm shorter than the distance L. In this state, the cutter was operated to press a stack of the fiber positive electrodes and the fiber negative electrodes inserted through the dies 141 and 142, while cutting away both ends of the stack. As a result, a fiber electrode stack 147 having a block shape was obtained as shown in FIG. 8A.

Figure 8B:
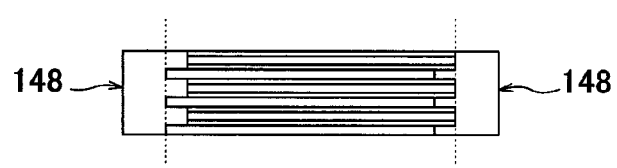
Figure 8C:
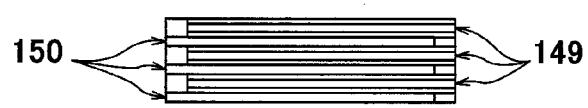

Next, as shown in FIG. 8B, PP resin 148 was applied to a positive electrode terminal side and a negative electrode terminal side of the fiber electrode stack 147. After the PP resin 148, which is an adhesive, was dried, the adhesive was grinded by using a grinder as indicated by dotted lines. As a result, as shown in FIG. 8C, positive electrode exposed portions 149 and negative electrode exposed portions 150 were exposed from the adhesive 148. A positive electrode terminal and a negative electrode terminal can be formed by bringing, for example, nickel metal plates into contact with these exposed portions.

(6) Arrangement of Fiber Positive Electrodes and Fiber Negative Electrodes in Fiber Electrode Stack FIG. 9A and FIG. 9B are schematic diagrams each showing arrangement of fiber positive electrodes and fiber negative electrodes in a fiber electrode stack which is fabricated by the above-described method in (5). Sheet-like fiber positive electrodes and sheet-like fiber negative electrodes are horizontally and alternately arranged, and then pressed together. As a result, as shown in FIG. 9A and FIG. 9B, each fiber positive electrode 151 comes into contact with fiber negative electrodes 152 at four points on the outside of the fiber positive electrode 151. Similarly, each fiber negative electrode 152 comes into contact with fiber positive electrodes 151 at four points on the outside of the fiber negative electrode 152. Since this arrangement prevents contact between fiber positive electrodes 151 and contact between fiber negative electrodes 152, the inter-electrode distance can be made shortest possible, which is ideal. FIG. 9B shows FIG. 9A being rotated to the right or left by 45 degrees. Thus, FIG. 9B is an equivalent diagram to FIG. 9A.

In order to realize fiber electrode arrangement as shown in FIGS. 9A and 9B with conventional art, it is necessary to arrange fiber positive electrodes and fiber negative electrodes one by one alternately. However, in reality, it is almost impossible to perform a task of alternately arranging several thousands to several tens of thousands of fiber electrodes, each of which has a diameter of approximately tens of micrometers. However, by using the method of fabricating an electrical storage device according to the present invention, an electrical storage device with ideal electrode arrangement can be obtained through a simple task as follows: a sheet-like fiber positive electrode and a sheet-like fiber negative electrode, each of which is obtained by processing several thousands of fiber electrodes into a sheet-like shape, are horizontally and alternately stacked, and then pressed together.

In the fiber electrode arrangement shown in FIG. 9A and FIG. 9B, each fiber negative electrode is squeezed in between fiber positive electrodes, and therefore, a distance to a counter electrode is minimized. This makes it possible to significantly reduce internal resistance at the time of charging/discharging. Also, a separator surface area can be greatly increased as compared to conventional fiber batteries, by forming a separator coating on each fiber electrode. Consequently, even in cases of lithium ion batteries, which have high resistance to electrolyte solution and for which it has been difficult to realize high-power capability, if the present invention is applied to such a lithium ion battery, the charging speed and discharging speed of the battery are greatly improved, and also, ultrafast charging within less than one minute, and large current discharging greater than a standard battery capacity by 100 times or more, are realized.

In FIG. 9A and FIG. 9B, the fiber positive electrode 151 and the fiber negative electrode 152 both have a round cross section. However, the cross-sectional shape is not limited thereto. The cross-sectional shape of the fiber positive electrode and the fiber negative electrode may be polygonal such as triangular or quadrangular, or may be oval.

Sheet-like fiber positive electrodes and sheet-like fiber negative electrodes may be arranged as shown in FIG. 9C, such that fiber positive electrodes 151 and fiber negative electrodes 152 are closest packed. In this case, each fiber electrode is surrounded by six fiber electrodes including fiber positive electrodes and fiber negative electrodes.

If the sheet-like fiber positive electrode and the sheet-like fiber negative electrode both have a sufficiently thin sheet thickness, then the electrode arrangement may be such that a plurality of sheet-like fiber positive electrodes are stacked together and a plurality of sheet-like fiber negative electrodes are stacked together, as shown in FIG. 9D. Assume a case where a single fiber thickness is 15 μm. In such a case, even if 10 sheets of sheet-like fiber positive electrodes, or 10 sheets of sheet-like fiber negative electrodes, are stacked, the stacked sheets have a thickness of merely approximately 150 μm. Usually, a conventional plate electrode has a thickness of approximately 300 μm. Accordingly, it can be expected that the stacked fiber electrode sheets, having a thickness that is approximately a half of the thickness of a conventional plate electrode, improve the charging speed and discharging speed.

Figure 10:
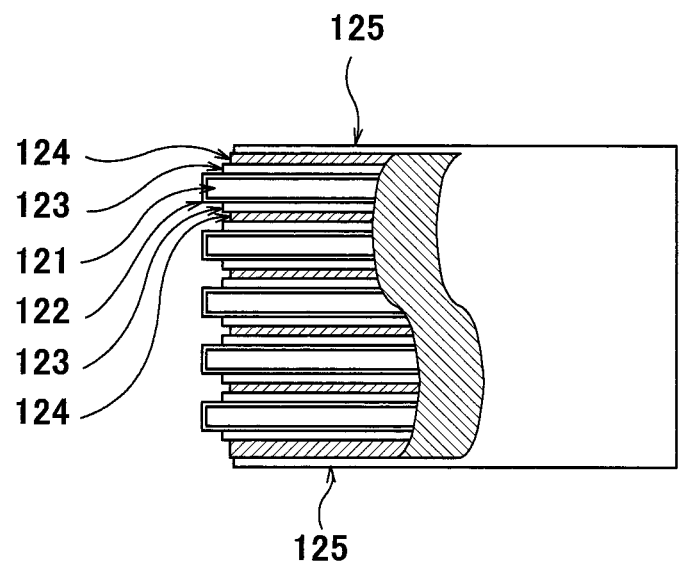
FIG. 10 is a plan view showing an example of an electrical storage device, which is formed from a stack of fiber positive electrodes, separators, and fiber negative electrodes.
Figure 11:
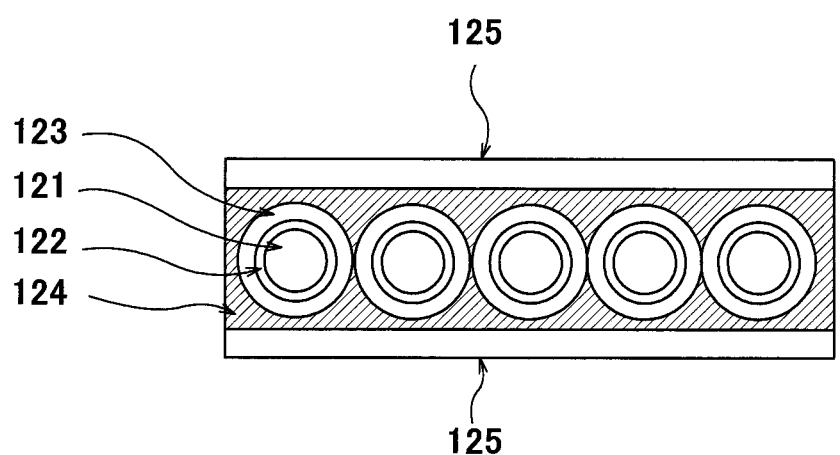
FIG. 11 is a cross-sectional view of FIG. 10.

Arrangement of fiber electrodes may be different from electrode arrangements shown in FIGS. 9A to 9D. FIG. 10 is a plan view showing an example of an electrical storage device, which is formed from a stack of fiber electrodes, separators, and thin counter electrode films. If the fiber electrodes are positive electrodes, the counter electrode films are negative electrodes. Alternatively, the fiber electrodes may be negative electrodes and the counter electrode films may be positive electrodes. FIG. 10 and FIG. 11 show an example where the fiber electrodes are positive electrodes. FIG. 10 is a partially cutaway plan view. In FIG. 10, the reference sign 121 denotes a fiber; the reference sign 122 denotes a plating coating on the fiber 121; the reference sign 123 denotes a positive electrode active material coating on the plating coating 122; the reference sign 124 denotes a separator coating on the positive electrode active material coating 123; and the reference sign 125 denotes a negative electrode active material coating.

FIG. 11 is a cross-sectional view of FIG. 10. As shown in FIG. 11, the fiber 121 with the coating 122 is coated with the positive electrode active material coating 123 which is a tubular coating. The positive electrode active material coating 123 is coated with the separator coating 124 which has a thickness of approximately 10 μm. The thickness of the separator coating 124 is approximately 1/10 of the separator thickness of a conventional fiber battery. Therefore, great improvement in high-power capability can be expected.

Example 4

Figure 12A:
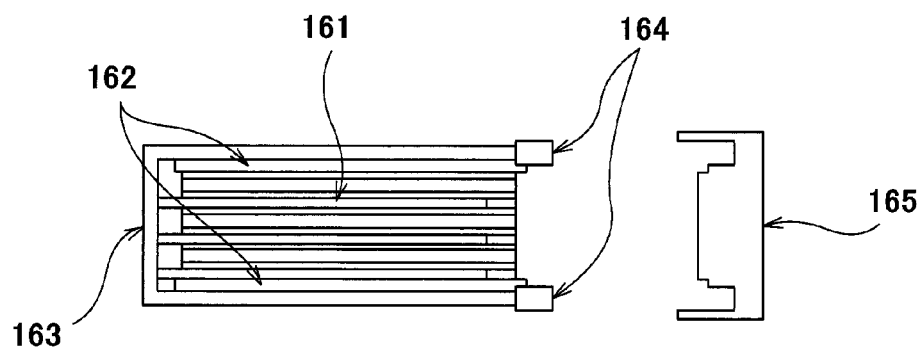
FIGS. 12A and 12B are schematic structural diagrams showing an example of an electrical storage device (a unit battery) according to the present invention.
Figure 12B:
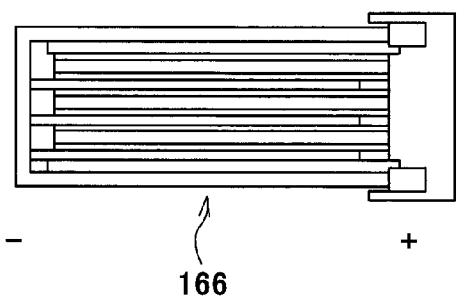

As shown in FIG. 12A, a fiber electrode stack 161, which was fabricated in Example 3 as shown in FIG. 8C, was wrapped around by a polypropylene spacer 162. Next, the fiber electrode stack 161 was placed in a stainless battery casing 163 (i.e., a negative electrode terminal) having a square cross section. Polypropylene spacers 164 were attached to an end, of the battery casing 163, that does not cover the stack 161. $Li_3PO_4$ can directly act as a solid electrolyte. However, in order to further improve high-power capability, an electrolyte solution (an electrolyte solution that is obtained by dissolving $LiPF_6$ at a concentration of 1 mol/L into a liquid in which ethylene carbonate (EC) and diethyl carbonate (DEC) are mixed in a volume ratio of 1:1) was injected, and then the stack 161 was sealed by a stainless cover 165 (i.e., a positive electrode terminal). In this manner, a fiber battery 166 as shown in FIG. 12B was fabricated. Since the spacers 164 are interposed between the battery casing 163 and the cover 165, the battery casing 163 and the cover 165 are insulated from each other. Accordingly, the battery casing 163 acts as a positive electrode terminal and the cover 165 acts as a negative electrode terminal. The battery capacity was confirmed to be 250 mAh.

As an activating process, charge-discharge cycles were repeated ten times with a current of 50 mA at 50° C. Here, a charge cutoff voltage was set to 4.2 V, and a discharge cutoff voltage was set to 1.5 V. Next, the battery was charged with a current of 50 mA, and discharged with 250 mA, 500 mA, and 1000 mA. As a result, almost no current decrease or no voltage decrease was observed as compared to a case where discharging was performed with a current value of 50 mA. In terms of discharging per unit amount of a positive electrode active material, a discharge amount of approximately 110 mAh/g was realized. An average discharge voltage of approximately 3.1 V was confirmed. Even when the discharge current was increased to 12.5 A, the discharge capacity at the time was 80% of the discharge capacity at the time of discharging with 50 mA, and also, the average discharge voltage was approximately 2.3 V.

The fiber battery shown in FIG. 12B has a structure in which the fiber electrode stack 161 is sealed by the battery casing 163 and the cover 165. However, as an alternative example, the fiber electrode stack shown in FIG. 8A or FIG. 8C may be inserted in a cylindrical case of which both ends are opened, or an insulating rope may be wound around the fiber electrode stack. In such a manner, a fiber battery that is in the form of a fiber electrode stack may be formed.

(7) Fabrication of High-Capacity Electrical Storage Device

Figures 13A, 13B:
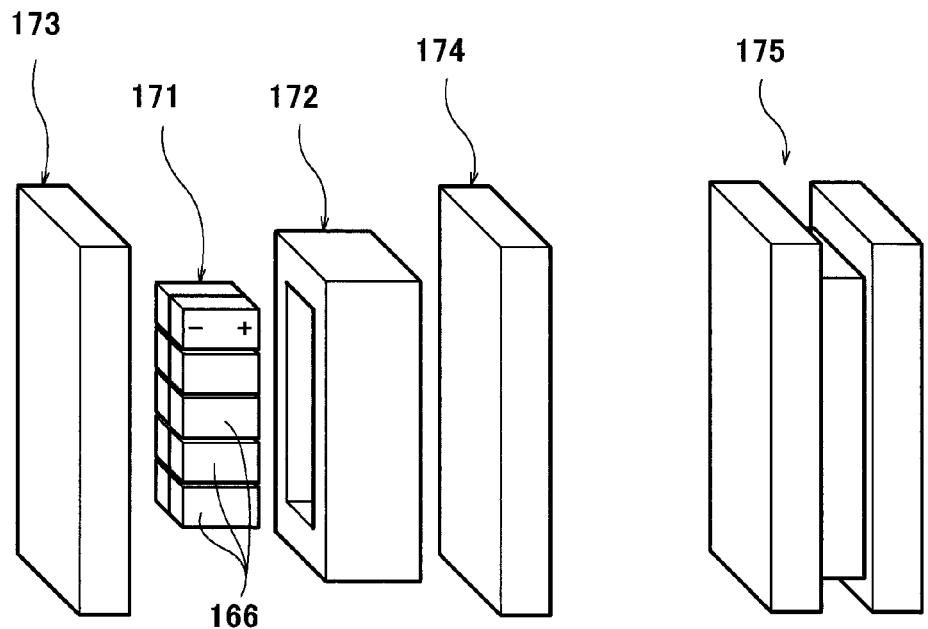
FIGS. 13A and 13B are schematic structural diagrams showing a high-capacity battery which is formed by combining a plurality of unit batteries.

FIG. 13A shows a case where the fiber battery 166 in Example 4 is used as a unit battery and a plurality of the unit batteries are stacked and connected in parallel (FIG. 13A shows two groups of five unit batteries, i.e., a total of ten unit batteries). In FIG. 13A, the ten unit batteries are defined as a unit battery stack 171. The unit battery stack 171 is accommodated in an insulating framework member 172 (e.g., a polypropylene cell frame), and a positive electrode terminal side and a negative electrode terminal side of the unit battery stack 171 are covered with electrically conductive framing members 173 and 174 (e.g., nickel-plated steel plates). In this manner, a high-capacity battery 175 as shown in FIG. 13B is formed. The capacity of the battery 175 can be increased by increasing the number of fiber batteries 166 that form the unit battery stack 171.

Figure 14:
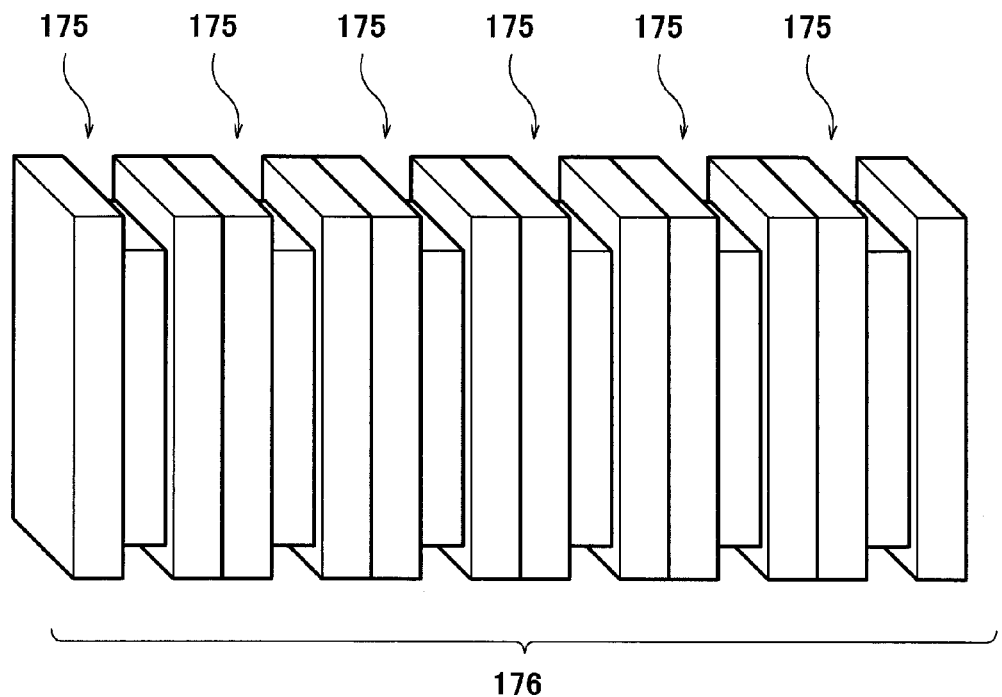
FIG. 14 is a schematic structural diagram showing a battery module which is formed by horizontally stacking a plurality of such high-capacity batteries as shown in FIG. 13.

Further, a battery module 176 as shown in FIG. 14 can be formed by horizontally stacking a plurality of high-capacity batteries 175. The high-capacity battery 175 shown in FIG. 13, in which a plurality of unit batteries 166 are connected in parallel, has a large capacity. However, the voltage of the battery 175 is the same as that of one fiber battery 166 which is a unit battery. Increased battery voltage as compared to one fiber battery 166, which is a unit battery, can be obtained by forming the battery module 176 in which a plurality of high-capacity batteries 175 are serially connected.

Figure 15:
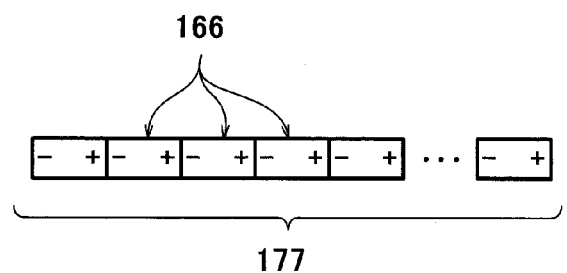
FIG. 15 is a schematic structural diagram showing a battery module which is formed by horizontally connecting a plurality of electrical storage devices (unit batteries) according to the present invention.

If increased battery voltage as compared to the voltage of one fiber battery 166, which is a unit battery, is desired, but having the same battery capacity as that of the unit battery is sufficient, then a battery module 177 as shown in FIG. 15 may be formed in which a plurality of unit batteries 166 are serially connected.

Figures 16A, 16B:
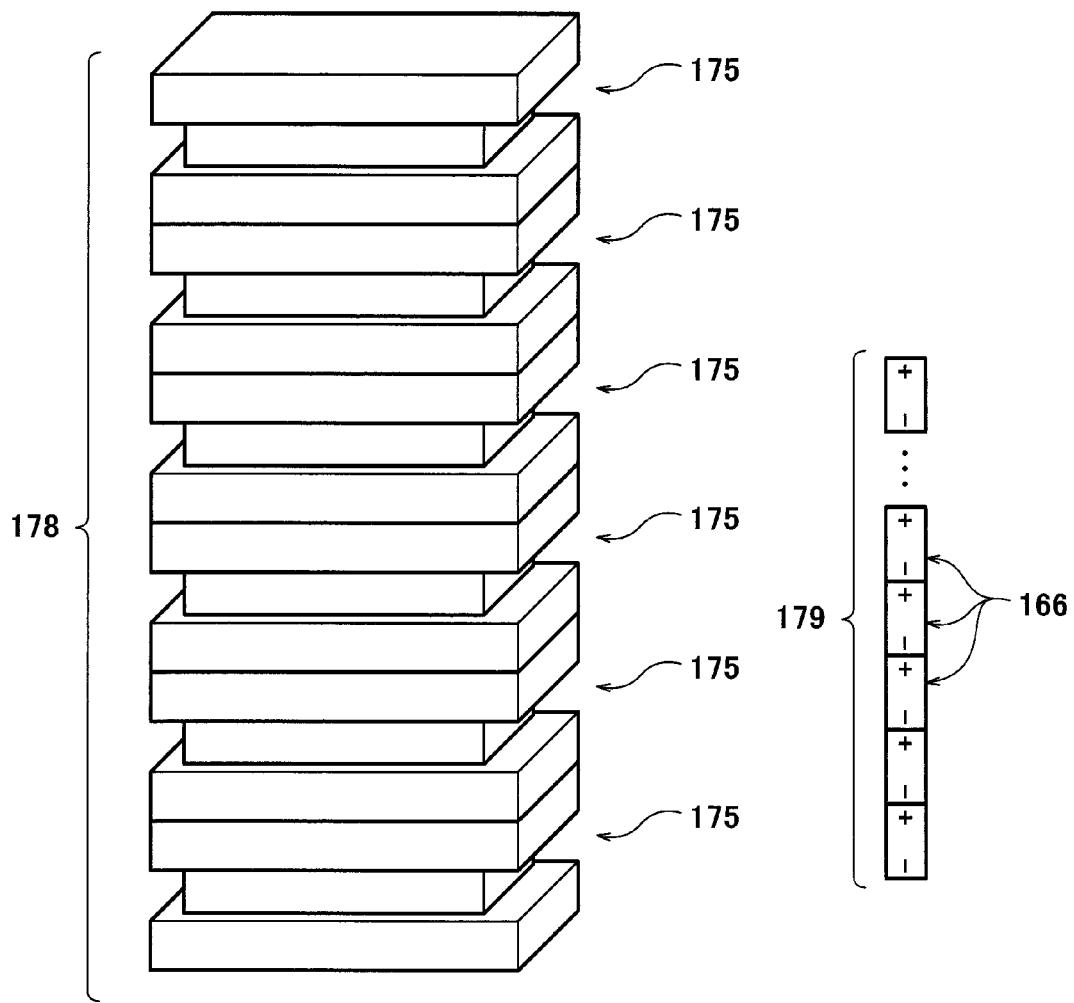
FIG. 16A is a schematic structural diagram showing a battery stack which is formed by vertically stacking a plurality of such high-capacity batteries as shown in FIG. 13.
FIG. 16B is a schematic structural diagram showing a battery stack which is formed by vertically connecting a plurality of electrical storage devices (unit batteries) according to the present invention.

A battery stack 178 as shown in FIG. 16A may be formed by vertically stacking a plurality of high-capacity batteries 175. Similarly, a battery stack 179 as shown in FIG. 16B may be formed by vertically connecting a plurality of fiber batteries 166, which are unit batteries.

In the battery module 176 as shown in FIG. 14, it is preferred that a cooling plate is inserted between adjacent batteries 175 to remove heat that is generated due to charging and discharging. The same is true for the battery stack 178 shown in FIG. 16A.

INDUSTRIAL APPLICABILITY

The electrical storage device and the method of fabricating the electrical storage device, according to the present invention, are useful in the field of batteries as an electrical storage device such as a lithium ion battery or lithium ion capacitor in which lithium ion is used as intercalating species, and as a method of fabricating the electrical storage device.

REFERENCE SIGNS LIST

1: winding roller
1a: winding roller
2: fiber spreading apparatus
2a: fiber spreading apparatus
3: plating bath
4: electrolytic bath
5: alkali tank
6: separator coating formation apparatus
6a: separator coating formation apparatus
7: pressurizing cutter
8: positive and negative electrode terminal formation apparatus
11: winding roller
12: fiber tow
13a, 13b: guide roller
14: compressed air
15a, 15b: air diffuser plate
16: roller
17: electrolytic bath (plating bath)
18: electrolyte solution
19: metal plate
20: DC power supply
21, 22, 23: roller
24a, 24b: guide roller
25: spray
26: air
27: reel roller
71: winding roller
72: fiber tow
73a, 73b: guide roller
74: compressed air
75a, 75b: air diffuser plate
76: roller
77: plating bath
78: metal plate
79: DC power supply
80, 81, 82, 83, 84: roller
85, 86, 87: spray
88: air
89: electrolytic bath
90: metal plate
91: DC power supply
92, 93, 94, 95: roller
96: spray
97: air
98: reel roller
101: fiber electrode
102: spray
103: air
104: slurry dripping device
105: scraper
106: warm air
107a, 107b: slurry coating
108a, 108b: pressing roller
109: reel roller
110: glass substrate
111: heating device
112: polyester sheet
113, 114: roller
115: nut
116: bolt
117: scraping plate
118: roller
119: liquid pool
120a, 120b: separator coating
121: fiber
122: plating coating
123: positive electrode active material coating
124: separator coating
125: negative electrode active material coating
141: left side die
142: right side die
143: fiber negative electrode
144: fiber positive electrode/separator stacked body
145: cutter
146: fixed base
147: fiber electrode stack
148: adhesive
149: positive electrode exposed portion
150: negative electrode exposed portion
151: fiber positive electrode
152: fiber negative electrode
161: fiber electrode stack
162: spacer
163: battery casing
164: spacer
165: cover
166: fiber battery (unit battery)
171: unit battery stack
172: insulating framework member
173, 174: electrically conductive framing member
175: high-capacity battery
176, 177: battery module
178, 179: battery stack

The invention claimed is:

1. An electrical storage device comprising:
a plurality of fiber positive electrodes, each of the fiber positive electrodes including an electrically conductive fiber and a positive electrode active material, the positive electrode active material being coated on a surface of the fiber, the positive electrode active material containing a transition metal oxide represented by a chemical formula 1 which is $(Li_{1-x}A_x)_a M_b X_c O_d$;
a plurality of fiber negative electrodes, each of the fiber negative electrodes including an electrically conductive fiber and a negative electrode active material, the negative electrode active material being coated on a surface of the fiber;
a separator; and
an electrolyte, wherein
the fiber positive electrodes and the fiber negative electrodes are alternately stacked in such a manner that horizontal end positions of the fiber positive electrodes do not overlap horizontal end positions of the fiber negative electrodes,
a stack of the fiber positive electrodes and the fiber negative electrodes is vertically press-formed and cut such that the fiber positive electrodes protrude from a first end of the stack forming a positive electrode terminal portion and the fiber negative electrodes protrude from a second end of the stack forming a negative electrode terminal portion,
the positive electrode terminal portion and the negative electrode terminal portion are sealed with an insulating adhesive such that only an end of the protruding positive electrode terminal portion and an end of the protruding negative electrode terminal portion are exposed, the exposed ends of the protruding electrode terminal portions are in direct contact with metal plates, thereby forming a positive electrode terminal and a negative electrode terminal, and wherein in the chemical formula 1, A is at least one kind of alkali metal selected from the group consisting of Na, K, Rb, and Cs;

M is at least one kind of transition metal selected from the group consisting of Ti, V, Cr, Mn, Fe, Co, Ni, Cu, Nb, Mo, Ru, Pd, Ag, Ta, W, Ce, Pr, Sm, Eu, and Pb;

X is at least one kind of typical elements selected from the group consisting of B, Al, Si, P, S, Ga, and Ge; and $0<a\leq6$, $1\leq b\leq5$, $0\leq c\leq4$, $0<d\leq12$, $0\leq a/b\leq4$, and $0\leq x\leq0.5$.

2. The electrical storage device according to claim 1, wherein a separator coating is formed on the fiber positive electrodes and/or on the fiber negative electrodes.

3. The electrical storage device according to claim 2, wherein each of the fiber positive electrodes includes an Al plating coating between the fiber and the positive electrode active material.

4. The electrical storage device according to claim 2, wherein each of the fiber negative electrodes includes a Cu plating coating or a Ni plating coating between the fiber and the negative electrode active material.

5. The electrical storage device according to claim 1, wherein a solid electrolyte film is formed on the fiber negative electrodes.

6. The electrical storage device according to claim 5, wherein each of the fiber positive electrodes includes an Al plating coating between the surface of the fiber and the positive electrode active material.

7. The electrical storage device according to claim 5, wherein each of the fiber negative electrodes includes a Cu plating coating or a Ni plating coating between the fiber and the negative electrode active material.

8. A battery comprising:
   a plurality of the electrical storage devices according to claim 1;
   an insulating framework member; and
   an electrically conductive framing member.

9. An electrical storage device stacked body, comprising a plurality of the electrical storage devices according to claim 1, the electrical storage devices being stacked either horizontally or vertically.

10. A stacked body, comprising a plurality of the batteries according to claim 8, the batteries being stacked either horizontally or vertically.

* * * * *